United States Patent
Arhab et al.

(10) Patent No.: US 6,193,036 B1
(45) Date of Patent: Feb. 27, 2001

(54) HYDROKINETIC COUPLING APPARATUS WITH LOCK-UP CLUTCH FOR MOTOR VEHICLE

(75) Inventors: Rabah Arhab, St Brice sur Foret; Luc Thevenon, Lyons; Alain Lemaire, Amiens; Jean-Claude Bochot, Claye-Souilly, all of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/242,824

(22) PCT Filed: Jun. 30, 1998

(86) PCT No.: PCT/FR98/01393

§ 371 Date: Sep. 23, 1999

§ 102(e) Date: Sep. 23, 1999

(87) PCT Pub. No.: WO99/01683

PCT Pub. Date: Jan. 14, 1999

(30) Foreign Application Priority Data

Jun. 30, 1997 (FR) .................................................. 97 08386
Dec. 8, 1997 (FR) .................................................. 97 15600

(51) Int. Cl.[7] .................................................. F16H 45/02
(52) U.S. Cl. ...................................... 192/3.29; 192/70.18
(58) Field of Search .............................. 192/3.29, 70.18, 192/200

(56) References Cited

U.S. PATENT DOCUMENTS

| 2,253,344 | 8/1941 | Nutt et al. . | |
|---|---|---|---|
| 2,841,262 | 7/1958 | Zeidler . | |
| 2,858,681 | 11/1958 | Smirl et al. . | |
| 4,353,444 | * 10/1982 | Bionaz | 192/3.29 |
| 4,750,600 | 6/1988 | Adachi . | |
| 5,613,582 | * 3/1997 | Jackel | 192/3.29 |
| 5,826,690 | * 10/1998 | Maingaud et al. | 192/70.18 |
| 6,065,577 | * 5/2000 | Arhab et al. | 192/70.18 |
| 6,079,530 | * 6/2000 | Arhab | 192/3.29 |

FOREIGN PATENT DOCUMENTS

| B18144 | 11/1955 | (DE) . |
| 2711756 | 5/1995 | (FR) . |
| 2738890 | 3/1997 | (FR) . |
| WO 97/42433 | 11/1997 | (WO) . |

* cited by examiner

Primary Examiner—Richard M. Lorence
(74) Attorney, Agent, or Firm—Liniak, Berenato, Longacre & White

(57) ABSTRACT

The invention concerns an apparatus comprising a piston fixed by circumferential tabs (26) to a transverse wall (11), the piston (20) or the wall (11) having through holes for fixing the tabs (26), said holes being finally closed by shutters. The invention is applicable to motor vehicles.

21 Claims, 16 Drawing Sheets

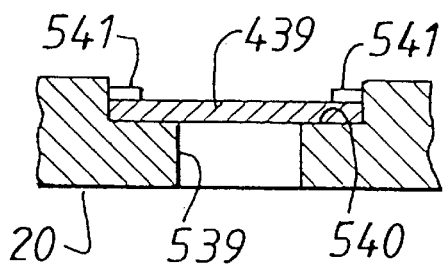
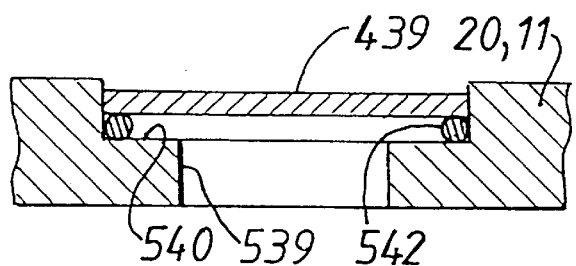
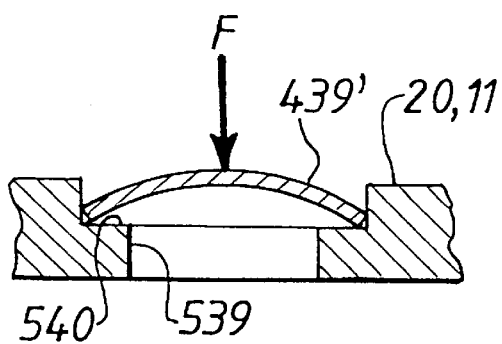
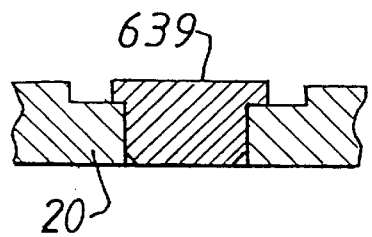
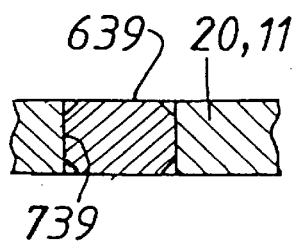
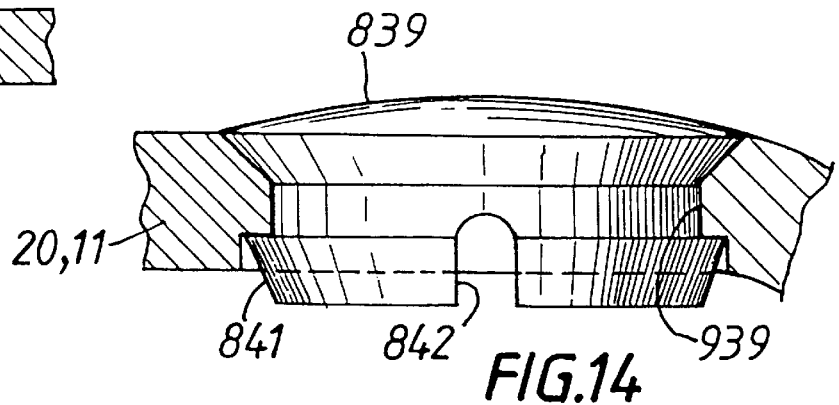

HYDROKINETIC COUPLING APPARATUS WITH LOCK-UP CLUTCH FOR MOTOR VEHICLE

The present invention concerns hydrokinetic coupling appliances, notably for motor vehicles, equipped with a locking clutch, usually referred to as a "lock-up" clutch, for mechanically making their turbine wheel and their impeller wheel integral with respect to rotation, as described for example in the document FR-A-2 726 620.

In this document, the hydrokinetic coupling appliance has, inside a sealed casing, filled with oil, a torque converter with a turbine wheel and an impeller wheel, and a lock-up clutch.

In general terms the casing has a first half-shell provided with an axially fixed transverse wall by means of which it is connected to the driving shaft. The turbine wheel is connected to an internally fluted hub for rotatably connecting it to a driven shaft.

The first half-shell, and therefore the casing, forms the input element of the hydrokinetic coupling appliance which is rotary in operation, whilst the hub forms the output element of the said appliance.

Being a case of an application for a motor vehicle, the driving shaft consists of the crankshaft of the vehicle engine, whilst the driven shaft consists of the input shaft of the transmission box.

The lock-up clutch has at least one friction lining which, fixed with respect to rotation to the turbine wheel and hub, either directly, or indirectly by means of a torsion damper, is disposed axially between on the one hand the said transverse wall fixed with respect to the impeller wheel and on the other hand a piston which is mounted so as to be able to move axially with respect to the transverse wall forming a counter-piston. This piston is rotatably connected to the transverse wall, usually by elastic tongues substantially elongated tangentially to a circumference of the whole. This type of circumferentially acting tongue will hereinafter be referred to as a tangential tongue.

These tongues are mounted inside a variable-volume control chamber delimited on the one hand radially externally by the friction lining and radially internally by a cylindrically shaped centring device adjacent to the transverse wall and on the other hand axially by the piston and transverse wall.

These tongues are fixed at one of their ends firstly in a fluidtight manner to the transverse wall of the casing, either directly or by means of a driving piece which is separate or in a single piece with the tangential tongue.

This fixing is easy to achieve, for example by means of rivets issuing by extrusion from the transverse wall.

Next the other end of the tongue is fixed to the piston. Having regard to the location of the tongues in the control chamber, this fixing is effected by means of two-part fixing members, for example a rod with a shouldered head mounted in the control chamber.

This rod passes, with radial clearance, through the piston and is connected by crimping to a ring situated outside the control chamber.

The rod is fixed to the tongues. Thus the fixing is effected by acting on only one side of the outside of the control chamber and by breaking the rod.

The fixing members are therefore relatively expensive and it is necessary to have recourse to a traction tool for breaking the rod and a crimping tool for crimping the ring on the notched rod.

The object of the present invention is to mitigate this drawback, in a simple and economical fashion.

An aim of the invention is therefore to fix the elastic tongues to the elastic fixing member of standard type, whilst locating the tongues in the control chamber.

According to the invention, a lock-up clutch of the type indicated above in which the elastic tongues are fixed on the one hand at one of their circumferential ends by first means of fixing to one of the transverse wall/piston pieces, referred to as the first piece, and on the other hand at the other one of their circumferential ends by second means of fixing to the other one of the transverse wall/piston pieces, referred to as the second piece, is characterised in that the first piece has passage holes coinciding axially with the second fixing means and in that the passage holes are closed off at the end by sealing obturators.

By virtue of the invention the fixing means can be of the same type. Because it is possible to act, by virtue of the invention, on both sides of the transverse wall/piston pieces, the tongues can be fixed by bonding or welding to the pieces in question. The fixing means, in a variant, can consist of fixing members.

By virtue of the invention the fixing members are then more economical and can be of a standard type without there being any need to break a rod and to crimp a ring because, by virtue of the passage holes, it is possible to act on both sides of the second piece on the second fixing members by means, in a known fashion, of a tool and a counter-tool.

Thus the piston can be fixed to the tongues by means of simple rivets passing through associated openings in the piston with smaller radial clearance so that coupling of the piston to the elastic tongues is more certain.

The relative movements between the piston and the tongues are reduced in all cases.

The first fixing members can be identical to the second fixing members. For example, it can be a case of conventional rivets or rivets formed by extrusion from the transverse wall and the piston.

The obturators are introduced at the end, after fixing of the tongues, in the passage holes in order to close these off in a fluidtight manner.

The obturators can, for this purpose, be force-fitted, or fitted by contraction followed by expansion in the passage holes, or fixed by welding, snapping-in, screwing, deformation, crimping or bonding to the transverse wall/piston piece concerned.

Naturally, depending on whether the holes are produced in the transverse wall or the piston, it is possible to first of all fix the tongues to the transverse wall and then to the piston or in the other case first of all fix the tongues to the piston and then to the transverse wall. Naturally, passage holes can be provided in the piston and in the transverse wall.

By virtue of the invention there are therefore more possibilities, with regard to the manufacturing process, whilst having the possibility of acting axially in both directions, that is to say on each side of the piston and of the transverse wall and without using a tool for crimping a ring and breaking a rod by traction.

In one embodiment, the obturators consist of plugs.

Advantageously, the passage holes are stepped in diameter in order to form a transverse internal shoulder connecting the smaller-diameter portion to the larger-diameter portion of the passage hole.

Advantageously, the plug is also stepped in diameter whilst being shouldered, in a manner complementary to that of the passage hole. As a result the plug has a head and a body and the larger-diameter head of the plug comes to be housed in the larger-diameter portion of the passage hole and comes into abutment against the shoulder of this hole by means of its transverse shoulder connecting the head of the plug to its smaller-diameter body introduced into the smaller-diameter portion of the passage hole.

This body can be knurled for forcible introduction of the plug into the passage hole.

This body can be threaded and the smaller-diameter portion of the passage hole is then given a female thread. The plug is then screwed into one of the transverse wall/piston pieces. The plug is shorter axially than the passage hole.

It will be appreciated, when the plug with a shouldered head is introduced into the stepped passage hole of the piston, that the hydraulic pressure prevailing on the side of the piston opposite to the control chamber prevents the plug from coming out again when the lock-up clutch is engaged since the said pressure is then greater than that prevailing in the control chamber.

All this harmonises well with the dished shape of the piston increasing its strength. Naturally the elastic tongues can be inclined. In all cases they are circumferentially oriented and axially elastic.

As a variant, the obturator consists of a ring. The passage holes are then stepped in the aforementioned manner in order to form a stop shoulder for the ring immobilised by crimping, bonding, deformation or welding in contact with the shoulder.

As a variant, a sealing joint can be interposed between the shoulder and the ring. Naturally, the passage hole can be of uniform diameter. In this case, a pellet is cooled, for example to −40°, by dipping it in liquid nitrogen, and is then easily introduced into the passage hole. The pellet contracts and then expands in order to close off the passage hole sealingly. The method of fixing is also applicable to a plug.

As a variant, the obturator can be doubly stepped to form two transverse shoulders disposed on each side of a central part of smaller diameter. One of the shoulders serves as a support for the head of a plug, the free end of whose body has at least one notch coming into engagement, after passing through the central part of the passage hole, with the other shoulder for mounting of the plug by snapping in.

Advantageously, several notches are provided. These notches belong to lugs which are elastically deformable radially. The number of lugs depends on the application. A single notch can be provided. The plug is advantageously made of synthetic material, such as plastic material, so as to have the required elasticity.

The obturator can be curved originally and then flattened under force. It can be a question for example of a curved washer flattened under force in the stepped passage hole. The obturator can be in the form of a dish or pan, with an inclined rim. By forcibly mounting the obturator in its passage hole, the rim is deformed and, at the end of the travel, the bottom deformed so that the obturator is immobilised, its rim being in contact with one of the faces of the piston or of the transverse wall whilst its bottom is in contact with the other face of the piston or of the transverse wall.

The dish is, in one embodiment, carbonitrided and is therefore deformed on mounting by jamming in its mounting hole.

As a variant, the dish is stepped in diameter to form a shoulder. A Belleville washer is mounted in the dish. The external periphery of the Belleville washer being in contact with the shoulder, it is turned over in contact with the bottom in order to ensure locking of the obturator.

The obturator is, in one embodiment, provided with a recess at its external periphery for receiving a sealing joint coming into contact with the edge of the passage hole. In all cases, a perfect seal is obtained. In general terms, a joint can be associated with the obturator.

Usually the piston is mounted on a centring device interposed between the transverse wall and the hub fixed to the turbine wheel of the hydrokinetic coupling appliance.

The hub is fluted internally for connecting it with respect to rotation with the driven shaft, whilst the centring device has on the one hand at its centre a blind hole in communication with the driven shaft, provided internally with a feed channel, and on the other hand passages for connecting the blind hole to the control chamber.

By virtue of the invention, the piston can be mounted on the hub of the turbine wheel.

More precisely, according to one characteristic, the hub has on the one hand an internally fluted socket entering a blind hole in the centring device and on the other hand, parallel to its socket and radially beyond it, a radially oriented annular rim whose external periphery forms a guide surface for the piston, a sealing joint acting between the said rim and the piston.

By virtue of this arrangement the axial bulk is reduced and a sealing joint is saved.

This is because it would have been possible to create the guide surface on the centring device, hereinafter referred to as a ring, and in this case it would have been necessary to provide a joint at the guide surface and another joint at the hub in order to prevent, when the lock-up clutch is engaged, oil passing between the hub and the ring.

Here, with a single joint, there is a perfect seal, equally well when the lock-up clutch is engaged or disengaged.

According to another characteristic, an annular recess being formed between the rim and the socket, the ring enters inside the recess.

Thus the hub and ring are fitted together, so that the axial bulk is reduced.

The description which follows illustrates the invention with regard to the accompanying drawings, in which:

FIG. 9 is a partial view in section showing an obturator in the form of a plate fixed by crimping in its passage hole;

FIG. 10 is a view similar to FIG. 9, the plate being fixed by brazing in its passage hole;

FIG. 11 is a view similar to FIG. 10 in which the plate is fixed by deformation in its passage hole;

FIG. 12 is a view similar to FIG. 9, in which the obturator consists of a plug housed in the thickness of the piston;

FIG. 13 is a view similar to FIG. 12 in which the obturator consists of a pellet;

FIG. 14 is a view similar to FIG. 9 in which the obturator is a plug with a curved head;

Figure 1:
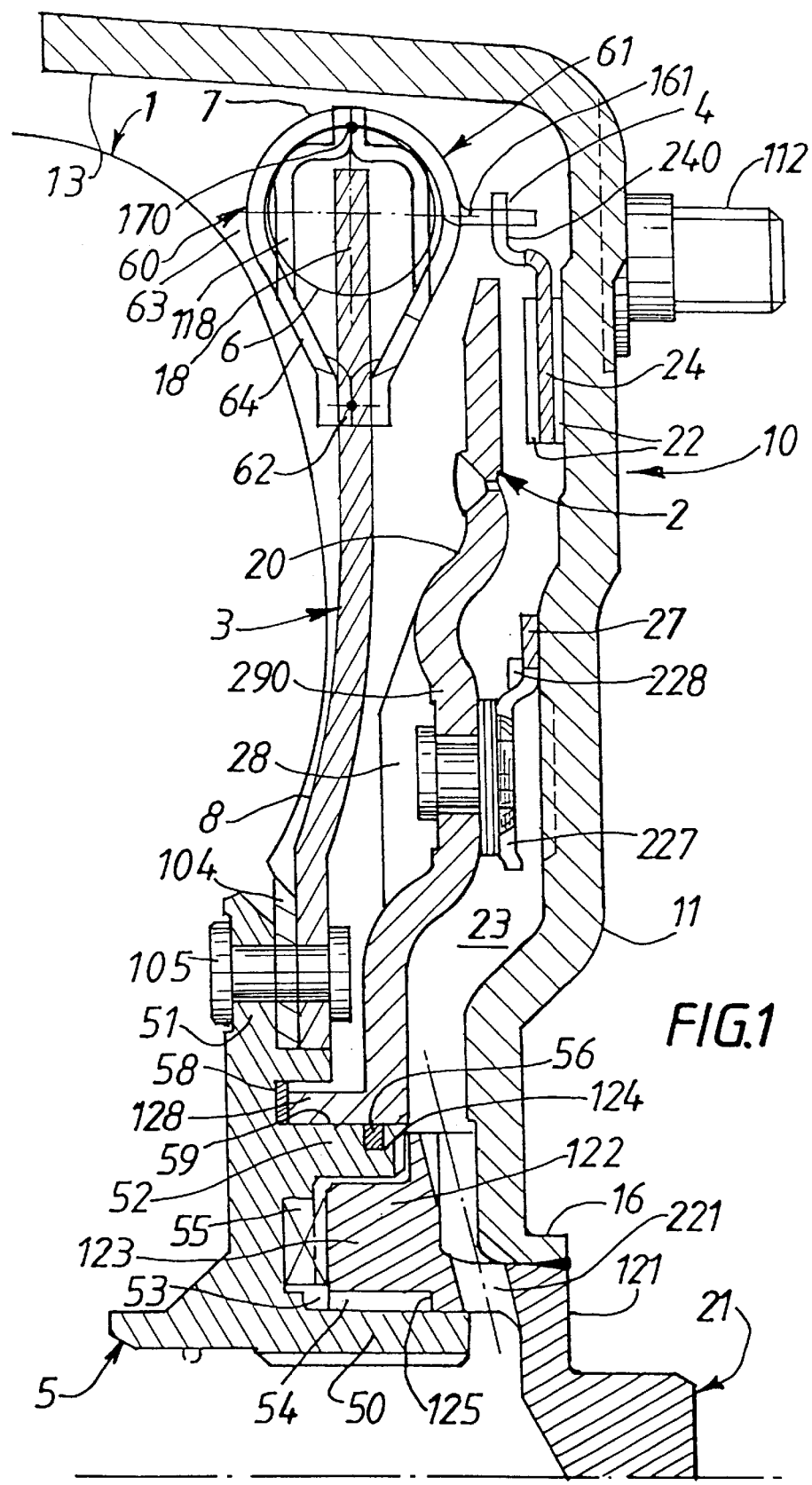
FIG. 1 is a partial half-view in axial section of the hydrokinetic coupling appliance showing the lock-up clutch according to the invention.

The hydrokinetic coupling appliance depicted in the figures is able to rotate about an axial axis of symmetry X—X and has, inside a sealed casing 10 filled with oil, a torque converter 1 and a lock-up clutch 2 provided with a torsion damper 3.

This appliance is intended to equip a motor vehicle with an internal combustion engine.

As is known, the torque converter 1 has an impeller wheel 100 with blades, a turbine wheel 101 with blades, a reaction wheel 102 and a freewheel 103 associated with the reaction wheel 102. All these elements are visible in FIG. 21 and partially in FIG. 2.

The casing 10 has a first half-shell 12 and a second half-shell 16 and forms the input element of the hydrokinetic coupling appliance by means of its first half-shell 12.

The first half-shell 12 has a wall 11 of roughly transverse orientation extended at its external periphery by an axially oriented cylindrical rim 13.

The transverse wall 11 carries screws 112 (FIG. 1) for connecting it by means of nuts to a shield 113 (FIG. 2) fixed to a driving shaft 200, here the crankshaft of the vehicle engine.

Figure 21:
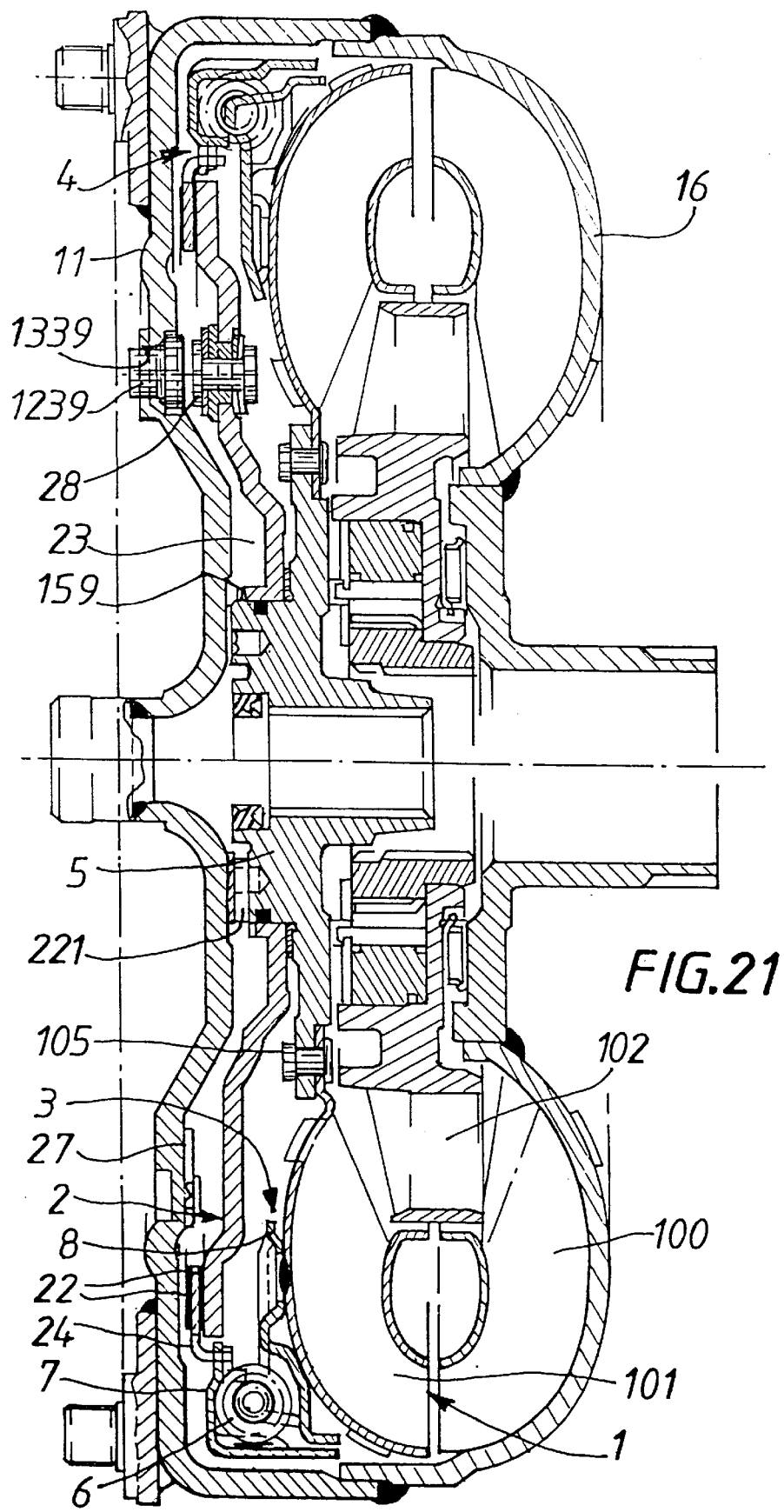
FIG. 21 is a view in axial section of a hydrokinetic coupling appliance for a variant embodiment with obturators reversed compared with those in FIGS. 1 to 4.

The blades of the impeller wheel 100 issue from the internal face of the second half-shell 16, here attached by welding to the free end of the rim 13, as can be seen in FIG. 21.

For more information reference should be made to the document FR-A-2 695 975.

The blades of the turbine wheel 101 are opposite to the blades of the impeller wheel 100.

The turbine wheel 101 is fixed at its internal periphery, by means of lugs or an annulus 104, to a hub 5 forming the output element of the hydrokinetic coupling appliance.

This hub 5 has at its centre an internally fluted socket 50 for connecting it with respect to rotation to a driven shaft 201, here the input shaft of the vehicle transmission box.

As is known, when the vehicle is started up, the impeller wheel 100 drives the turbine wheel 101 by virtue of the circulation of oil between the blades of the turbine 101 and impeller 100 wheels.

During this phase, the lock-up clutch 2 is disengaged or declutched, so that the torque is transmitted from the crankshaft to the first half-shell 12 and then to the hub 5 and to the driven shaft via the torque converter 1.

Next, in order to prevent any slip between the turbine 101 and impeller 100 wheels, the lock-up clutch 2 is engaged (clutched), so that the torque is transmitted from the crankshaft to the first half-shell 12 and then to the hub 5 and to the driven shaft via the lock-up clutch 2, whose torsion damper 3 is connected to the hub 5 and damps the vibrations generated by the vehicle engine.

To do this, the lock-up clutch 3 has here a piston 20, roughly of transverse orientation, mounted so as to be able to move axially in a sealed fashion along an axially oriented guide surface 59, as described below.

The clutch 2 also has two friction linings 22 disposed on each side of a drive disc 24.

The linings 22 and disc 24 are located axially between the piston 20 and the transverse wall 11 forming a counter-piston. This wall 11 is fixed axially.

A variable-volume control chamber 23 is delimited on the one hand laterally (axially) by the piston 20 and the wall 11 and on the other hand radially on the inside by a centring device 21, here cylindrical in shape, and radially on the outside by the linings 22 and disc 24.

The centring device 21 is fixed to the central part of the wall 11, as described below, and is provided at its centre with a blind hole 120 able to be fed with fluid from the driven shaft, projecting axially with respect to the second half-shell 16.

To do this, the driven shaft (depicted in broken lines at 201 in FIG. 2) has its centre a feed channel, whilst the centring device 21 has passages 221 for its blind hole 120 to communicate with the control chamber 23.

A principal chamber exists on the side of the piston 20 turned in the opposite direction to the transverse wall 11 and chamber 23.

The centring device 21 is located axially between the hub 5 and the wall 11, that is to say between the output and input elements of the hydrokinetic coupling appliance.

For reasons of simplicity, this centring device will hereinafter be referred to as the ring, since it is roughly in the form of a stepped ring machined at the rear, as described below. As a variant (FIG. 21), the centring device is omitted and the passages 221 are formed in the hub 5, guiding the piston.

By causing the pressure to vary on each side of the piston 20, for example by varying the pressure in the chamber 23, the piston 20 is allowed to move axially with respect to the axially fixed wall 11, either to clamp the friction linings 22 and disc 24 between the piston 20 and wall 11, or to unclamp the linings 22 and disc 24.

In the first case, the lock-up clutch is engaged or clutched at the end of the axial movement of the piston 20 in the direction of the wall 11.

In the second case, the piston 20 moves in the opposite direction to the wall 11 in order to disengage or declutch the clutch.

Here the friction linings 22 are fixed to the disc 24 whilst being for example bonded or brazed to the faces of the disc 24 on each side thereof.

As a variant, the linings are fixed to the piston 20 and transverse wall 11.

Thus the piston offers, at its external periphery, a friction face for the adjacent lining 22 or forms a fixing face for the said lining.

Naturally an intermediate piece can be fixed to the wall 11 in order to constitute a friction face for the relevant lining 22.

The disc 24 extends radially above the piston 20 in order to be connected, by a connection of the mortise and tenon type 4, to the torsion damper 3 which is thicker at its external periphery in the vicinity of the rim 13.

The torsion damper 3 has two coaxial parts 7, 8 mounted so as to be able to move angularly with respect to each other counter to circumferentially acting elastic means 6, here in the form of coil springs.

One of the parts, referred to as the input part 7, has two guide rings 60, 61 disposed on each side of the other part 8 in the form of a damper plate fixed at its internal periphery to the hub 5.

The input part 7 is connected with respect to rotation to the drive disc 24 by the mortise and tenon type connection 4 allowing axial movement of the disc 24.

Thus the input part 7 is disengageably connected to the transverse wall 11 forming part of the input element of the hydrokinetic coupling appliance, whilst the output part 8 is connected the output element 5 of the said appliance.

The damper 3 is located axially between the turbine wheel 101 and piston 20.

The hub 5 has, in a single piece with a socket 50, at its rear end, furthest away from the transverse wall 11, a transversely oriented shield 51 thinner at its external periphery in order to form a countersink delimiting an axially oriented shoulder, not referenced, for centring the damper plate 8 and the annulus or the lugs 104 of the turbine wheel 101. Rivets 105 connect the lugs 104 and damper plate 8 to the shield 51 and therefore to the hub. The damper plate 8 and lugs 104 are disposed side by side on the same side of the shield 51, the lugs 104 being in contact with the shield 51.

As a variant, the lugs or the annulus 104 and the damper plate 8 are disposed on each side of the shield 51.

The lugs 104, or as a variant the annulus 104, and the damper plate 8 can then be fixed by welding.

The ring 21 is stepped in diameter and is fixed, in a known fashion, by welding to a sleeve 16, directed towards the outside in the opposite direction to the piston 20, which the transverse wall 11 has at its centre.

Thus the ring 21 has on the one hand a front portion 121 with a smaller diameter forming a centring device and fixed by welding to the sleeve 16 and on the other hand a rear portion 122 with a larger diameter in which there are produced the passages 221 for communication between the chamber 23 and the central blind hole 120 in the ring 21. The ring 21, through its stepped front portion 121, is fitted in the sleeve 16 whilst being welded to the free end thereof by a welding bead.

The ring 21 is therefore centred by the transverse wall 11, the shoulder formed by the change in diameter between the portions 121, 122 being in abutment against the internal face of the wall 11 turned towards the piston 20.

The hub 5, directed axially towards the wall 11, enters through its socket 50 into the blind hole 120 in the ring 21 for reduction of the axial bulk at the centre of the hydrokinetic coupling appliance between the reaction wheel 102 and the transverse wall 11. The socket 50 extends axially as far as the passages 221 so as not to close them off and so as to increase its length to the maximum extent, which assists its sliding along the driven shaft 201.

The hub 5 has an axially oriented annular rim 52 issuing in a single piece from the shield 51 and directed axially towards the wall 11. This rim 52 therefore extends parallel to the hub 5 to the socket 50. It extends radially beyond the socket 50.

The rim 52 is shorter axially than the socket 50 and defines with the latter an annular recess 53 with a bottom closed off by the shield 51.

The ring 21 enters the recess 53 through its rear end 123 belonging to the rear portion 122. The pieces 21 and 5 therefore fit into each other.

A bearing 54 is interposed radially between the internal periphery of the rear portion 122 entering the groove 53 and the external periphery of the hub 5 in order to centre the hub 5 with respect to the ring 21. Here the bearing is fixed to the ring 21 and constitutes a pilot bearing.

An axial stop 55, here a needle bearing, acts between the transversely oriented bottom of the recess 53 and the rear face of the ring 21. To do this, the shield 51 is hollowed out locally in order to receive the stop 55.

A radial clearance exists between the external periphery of the rear portion 122 of the ring 21 and the internal periphery of the rim 52, the ring being of reduced diameter at this point in order to be able to enter the groove 53.

An axial clearance also exists between the free end of the rim 52 and the shoulder 124 formed by the change in diameter which the rear portion 122 has so that it can enter inside the annular groove 53.

As a result the external periphery of the rim 52 has roughly the same diameter as the larger-diameter external periphery of the rear portion 122, whilst being axially aligned with it.

The passages 221 affect the larger-diameter part of the portion 122 and are partly adjacent to the wall 11.

The passages 221 are formed by drillings opening out in the hole 120 and extended outwards by radial grooves affecting the face of the rear portion 122 in contact with the wall 11.

The piston 20 is here mounted so as to slide along a guide surface 59 formed by the external periphery of the rim 52, provided with a recess (not referenced) in the vicinity of its free end for mounting a sealing joint 56. This joint is a joint of the dynamic type since a relative rotation movement can occur between the piston 20, fixed with respect to rotation to the wall 11, and the hub 5 fixed to the turbine wheel 101.

For its sliding along the guide surface 59, the piston 20 has, at its internal periphery, an axially oriented ferrule 128 directed towards the shield 51, which has a groove 57 for housing an axial stop 58 intended to cooperate with the rear face of the ferrule 128 in order to reduce friction. The countersink and the groove delimit another rim (not referenced) parallel to the rims 51 and to the socket 50 and being axially shorter than them. The hub 5 thus has a comb shape with annular teeth with different and increasing lengths.

As a variant, the ferrule 128 can carry the joint 56 by means of a recess.

When the lock-up clutch 2 is engaged the liquid (oil) cannot enter the chamber 23 since the linings 22 are clamped and the joint 56 prevents any entry. The turbine wheel 101 is then mechanically fixed to the impeller wheel 100.

When the clutch is disengaged the liquid cannot flow towards the rim 51 because of the joint 56.

Naturally, the rear portion 122 has a shoulder 125 at its internal periphery, formed by means of a change in diameter, for cooperating with the front face of the bearing 54 mounted in the recess 53.

The external periphery of the socket 50 is in close centring contact with the internal periphery of the bearing 54 here fixed to the ring 21 different from that of a ring of the prior art through the machining of its rear portion.

The piston 20 is integral with respect to rotation with the transverse wall by means of tangential tongues 26 allowing axial movement of the piston along the rim 52 and its surface 59.

The tangential tongues 26, mounted in the chamber 23, act between the wall 11 and piston 20 and are axially elastic and circumferentially acting. The tongues 26 are fixed to a drive piece 27 fixed to the wall 11. This piece 27, more clearly visible in FIG. 24, can be extended radially in order to offer a friction force to the lining 22 concerned.

Such a mode of assembly is described in the document FR-A-2 726 620.

Thus the tongues 26, here mounted in a superimposed fashion, whose number depends on the application, are fixed by riveting at one of their ends to the drive piece 27, itself fixed by riveting to the wall 11, by means of rivets 228, issuing by extrusion from the wall 11. As a variant, other fixing members, such as normal rivets, screws, bolts, etc, can be used.

For this purpose, the drive piece has locally parts offset axially in the direction of the piston 20 for fixing the tongues. These parts are in the form of brackets 227.

As a variant, the drive piece 27 can be fixed to the wall 11 by welding or bonding.

As a variant, the tongues 26 are fixed directly to protrusions issuing from the wall 11 and provided with extrusions for riveting the tongues 26.

Naturally, the tongues 26 can be in a single piece with the drive piece.

For more information, reference should be made to the application FR-A-2 726 620.

The tongues 26 are fixed at the other end by means of rivets 28 to the piston 20. As a variant, the rivets are replaced by other fixing members such as screws, bolts, etc.

This is achieved by means of holes 29, here shouldered, which the wall 11 has coinciding axially with the rivets 28.

The holes 29 are passage holes for a tool for crushing the heads of the rivets 28, a counter-tool being placed on the other side of the piston 20 in order to effect the crimping as described below.

The passage hole 29 is stepped in diameter and has a smaller-diameter portion connected by a transverse shoulder to a larger-diameter portion.

This makes it possible to avoid the use of two-part fixing means, as described in the document FR-A-2 726 620.

Thus, as in this document, in FIGS. 1 to 4, the tongues 26 are first of all fixed, either directly to the wall 11, or the assembly consisting of drive piece 27 and tongue 26 to the wall 11.

Next, after fitting the disc 24, equipped with the two friction linings 22, between the wall 11 and the piston 20, the tongues are fixed by riveting, using rivets 28, to the piston 20, by introducing a tool into each hole 29 in order to deform the head of the rivet 28, a counter-tool acting on the other side of the piston 20 in order to form a support for the foot of the rivet 28. Preferably a removable centring device is used, engaged in the sleeve 16 for centring the ferrule 128 of the piston 20 during the operation of fixing the tongues 26 to the piston 20, and then the centring device is withdrawn and the ring 21 is fixed to the wall 11.

Naturally, the tongues 26 are fixed to the piston by means of dished parts 290 projecting axially in the direction of the wall 11, which the piston 20 has radially between its internal and external peripheries; the internal periphery of the piston 20 being offset axially in the opposite direction to the wall 11 with respect to its external periphery forming a friction face for the relevant lining 22.

For this purpose, the piston 20 has an inclined portion between its external and internal peripheries. It is in this inclined portion that the dished parts 290 are formed.

The number of tongues 26 and therefore of protrusions 290 depends on the application.

Naturally, according to the invention, after the passage holes 29 are finally closed sealingly by means of fluidtight obturators consisting in FIGS. 1 to 4 of fluidtight plugs 129. Here the plugs 129 are shouldered and fixed by welding, or as a variant by screwing or bonding, or force fitting, to the wall 11. The plugs 129 are for example metallic, being based on aluminium.

The plugs 129 are here stepped in diameter and shorter axially than the passage holes 29. The plugs 129 have a larger-diameter head, introduced into the larger-diameter portion of the passage hole 20, and a body, in the form of a rod, of smaller diameter, introduced into the smaller-diameter portion of the passage hole.

It will be noted that the shield 113 (FIG. 2), fixed by the screws 112 to the wall 11, has holes (not referenced) coinciding axially with the holes 29 for passage of the tool and plug 129.

The head of the plug 129 and the larger-diameter portion of the passage hole are here turned towards the side opposite to the piston 20, the body of the plug 129 being shorter axially than the smaller-diameter portion of the hole. Thus the plug is housed in the thickness of the wall 11.

Figure 7:
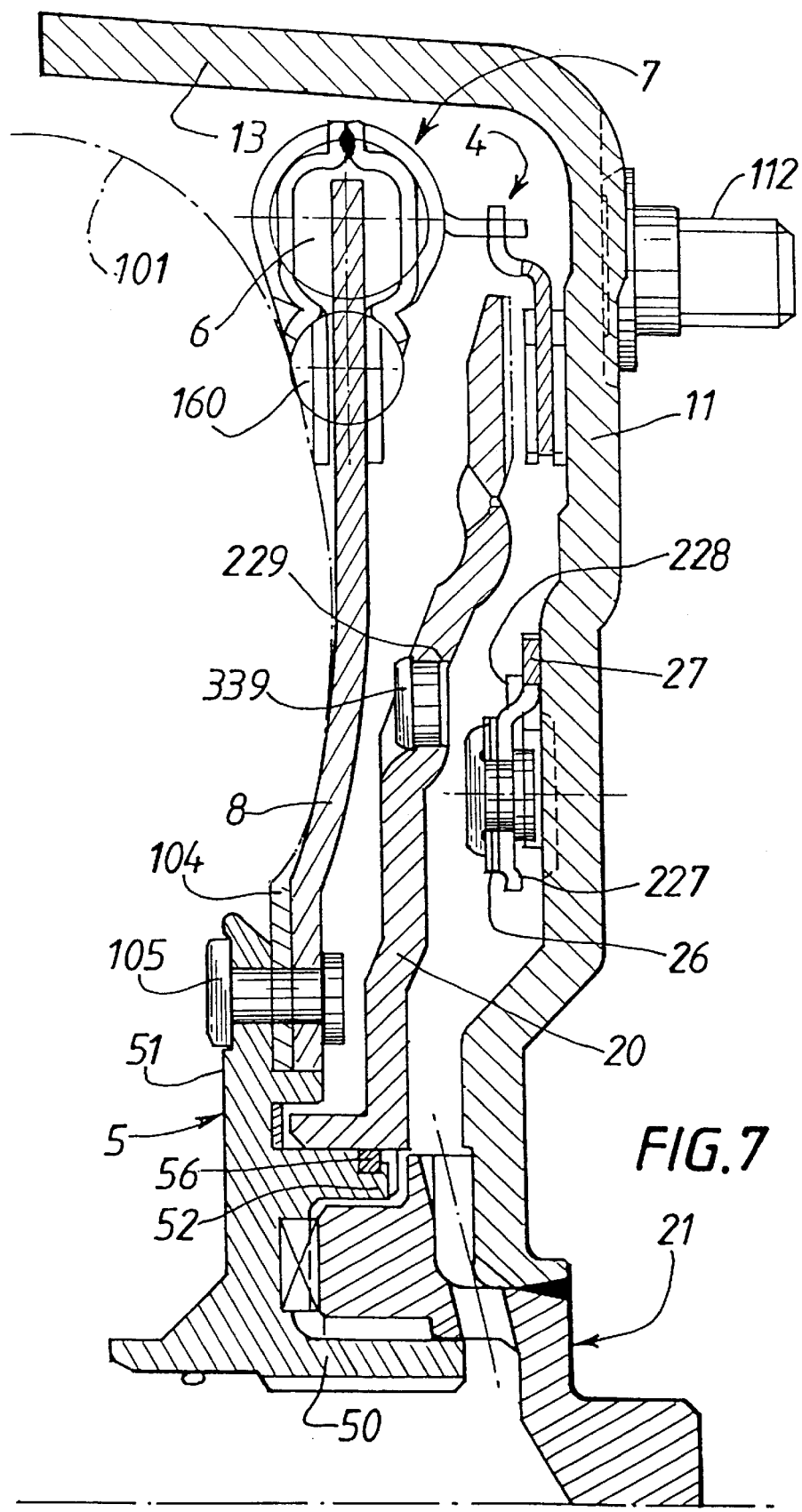
FIG. 7 is a view similar to FIG. 1 for a third example embodiment.

Naturally the structures can be reversed, as can be seen in FIG. 7.

In this case the passage holes 229 are produced in the piston and finally closed by a shouldered plug 339.

Thus the tongues are first of all fixed to the piston by means of the rivets 28, then the tongues 26 or drive piece 27, to which the tongues 26 are previously fixed, are fixed to the wall 11, the piston 20 having holes 229 coinciding axially with, for example, fixing rivets 228 issuing by extrusion from the wall 11. These holes enable a tool to pass to crush the rivets. Next the holes are plugged by means of a plug 339.

The torsion damper 3 has, according to one characteristic, two guide rings 60, 61 of symmetrical shape in order to reduce costs.

The two guide rings 60, 61 are symmetrical (identical overall), disregarding the drive lugs 161 on the guide ring 61, referred to as the first guide ring, closest to the piston 20.

The other guide ring 60, referred to as the second guide ring, is adjacent to the turbine wheel 101.

The guide rings 60, 61 are obtained with the same tooling. An additional operation is performed on the first guide ring 61 in order to obtain lugs 161 obtained by cropping and bending.

The lugs 161 are axially oriented and engaged in notches, not referenced, open radially towards the outside, and formed at the external periphery 240 of the disc 24. This external periphery 240 is offset axially with respect to its plane main part of the disc 24 to which the friction linings 22 are fixed.

The axial offsetting of the external periphery is effected in the direction of the first guide ring 61 in order to reduce the axial length of the lugs 161 offset radially towards the inside with respect to the external periphery of the guide rings 60, 61.

These guide rings 60, 61 are located at the external periphery of the turbine wheel 101 and wall 11. The external periphery of the rings 60, 61 extends in the vicinity of the rim 16 of the first half-shell 12.

Thus the springs 6 can extend to a major extent radially above the piston 20 and come as close as possible to the rim 13. The torsion damper 3 can allow large relative angular movements between its input part 7 and its output part 8, fixed at its internal periphery to the shield 51 of the hub 5, here by riveting, in the aforementioned manner.

The output part 8, forming a damper plate, has a curved shape to match the shape of the turbine wheel 101, so that the internal periphery of the damper plate 8 is offset axially in the direction of the shield 51 with respect to its external periphery extending parallel to the said internal periphery.

The external periphery of the damper plate 8 is formed by lugs 18 forming support lugs for the ends of the coil springs 6. The springs 6 extend between two consecutive lugs and have a long circumferential length.

Opposite the lugs 18, the guide rings 60, 61 have, facing, dished parts 118 for supporting the circumferential ends of the springs 6.

The guide rings 60, 61 are connected together at their internal periphery by means of lugs 62 issuing from the rings and engaged between two lugs 18. The lugs 62 extend at the external periphery of the damper plate 8.

Between the dished parts 118, the rings 60, 61 have a curved shape and are contiguous at the level of their free external edges. These rings are fixed together by means of welding points effected at the dished parts 118 and lugs 62, here contiguous.

The dished parts 118 are also contiguous (FIG. 1) and it is in this area that the fixing by welding is effected.

Figure 3:
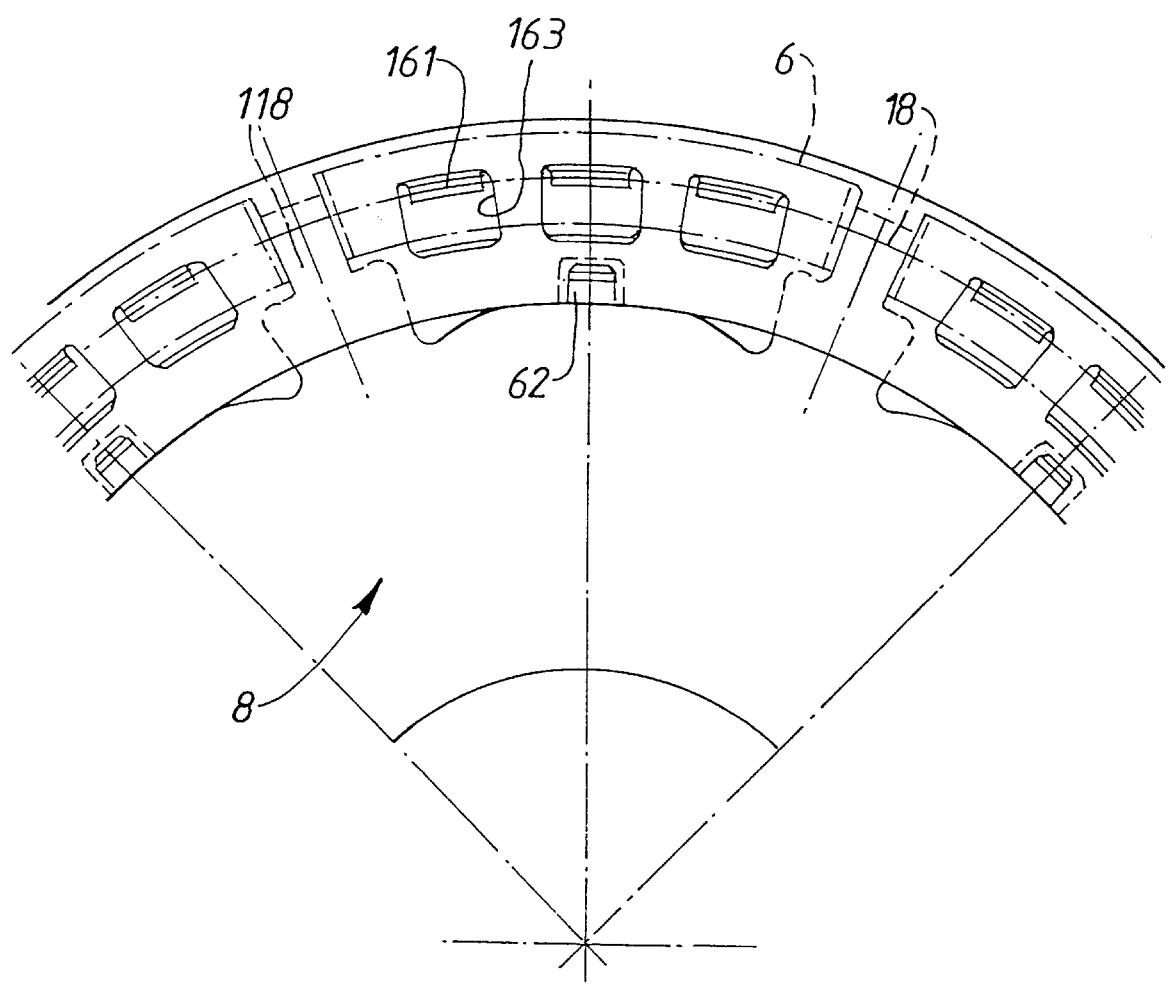
FIG. 3 is a partial front view of the guide ring with lugs of the torsion damper forming part of the lock-up clutch.

It will be noted that the lugs 161, forming lugs for connecting in rotation, issue from apertures 163 produced in the curved parts of the guide rings 60, 61 matching the shape of the coil springs 6, shown diagrammatically in broken lines in FIG. 3. The springs 6 are therefore held axially and radially by the guide rings 60, 61. These rings 60, 61, once assembled, externally envelop the springs 6 and have a circular contour 63 extending over more than 180° and extended at each of its ends by an inclined part 64. The inclined parts are convergent and it is in these that the lugs 62 are produced.

Naturally the rings 60, 61 are made from pressed plate.

The same applies to the wall 11 and piston 20. The inclined parts 64 make it possible to progressively reduce the axial bulk. This profile enables the guide ring 60 to come as close as possible to the turbine wheel 101.

Naturally, FIGS. 5 and 6, it is possible to profit from the inclined parts 64 in order to provide apertures 263 opposite these and to house, radially below the springs 6, a second series of springs 160, housed radially above the external periphery of the damper plate 8 and circumferentially between two lugs 18. The springs 160 are end-of-travel springs, the lugs 18 coming to compress the said coil springs at the end of the relative angular movement between the parts 7 and 8.

Figure 2:
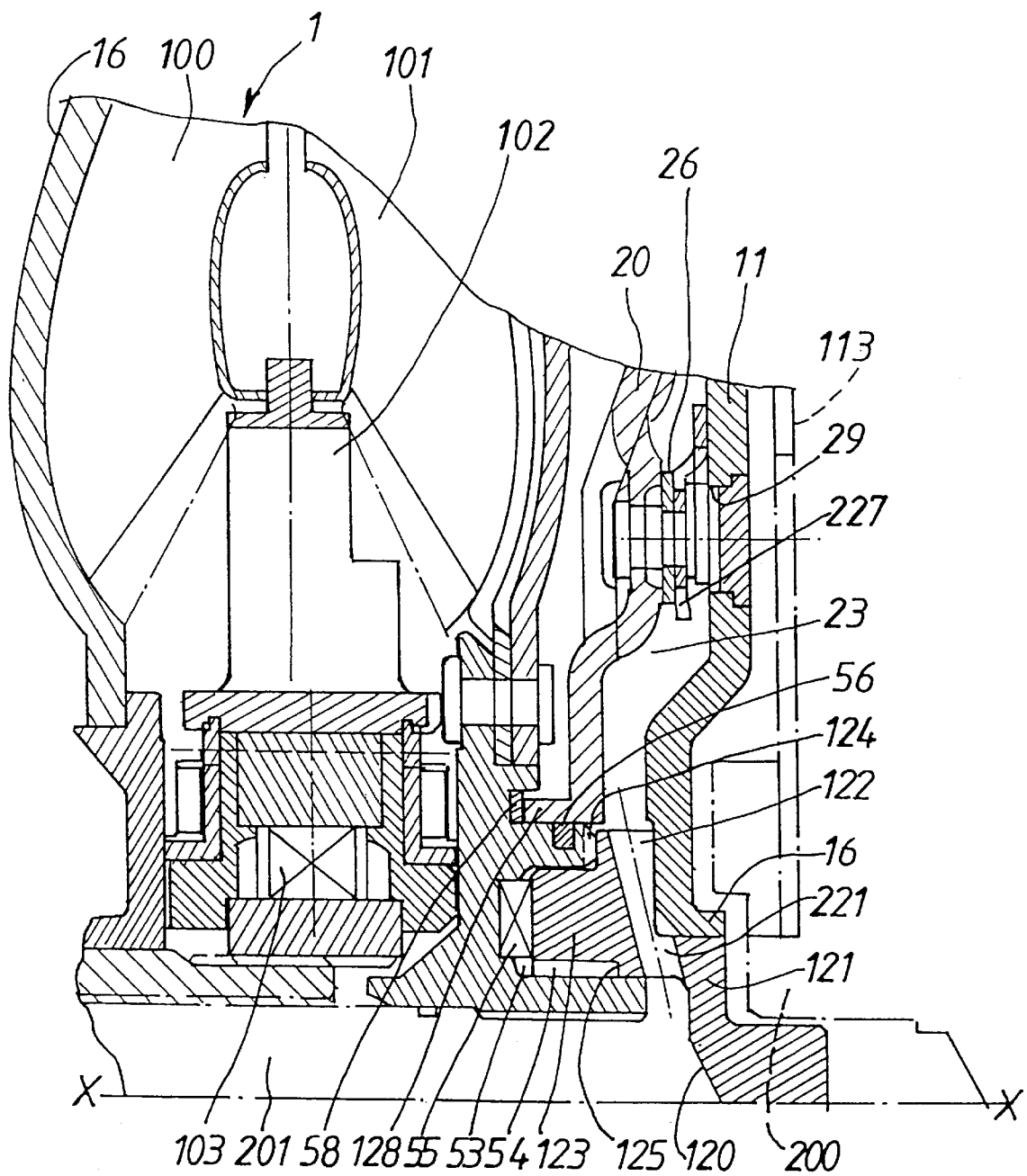
FIG. 2 is a view to a larger scale of the bottom part of FIG. 1 with depiction of the components of the torque converter.

These inclined parts can be dished locally at 165 in order to form support areas for braces, for example small columns 262 connecting together the guide rings 60, 61 and replacing the lugs 62 of FIG. 2.

FIG. 7 shows the same configuration, the difference relating to the holes 229, not shouldered, and plugs 339 affecting the piston 20 in the aforementioned manner for the fixings of the tongues. Thus the different figures can be combined together.

Figure 5:
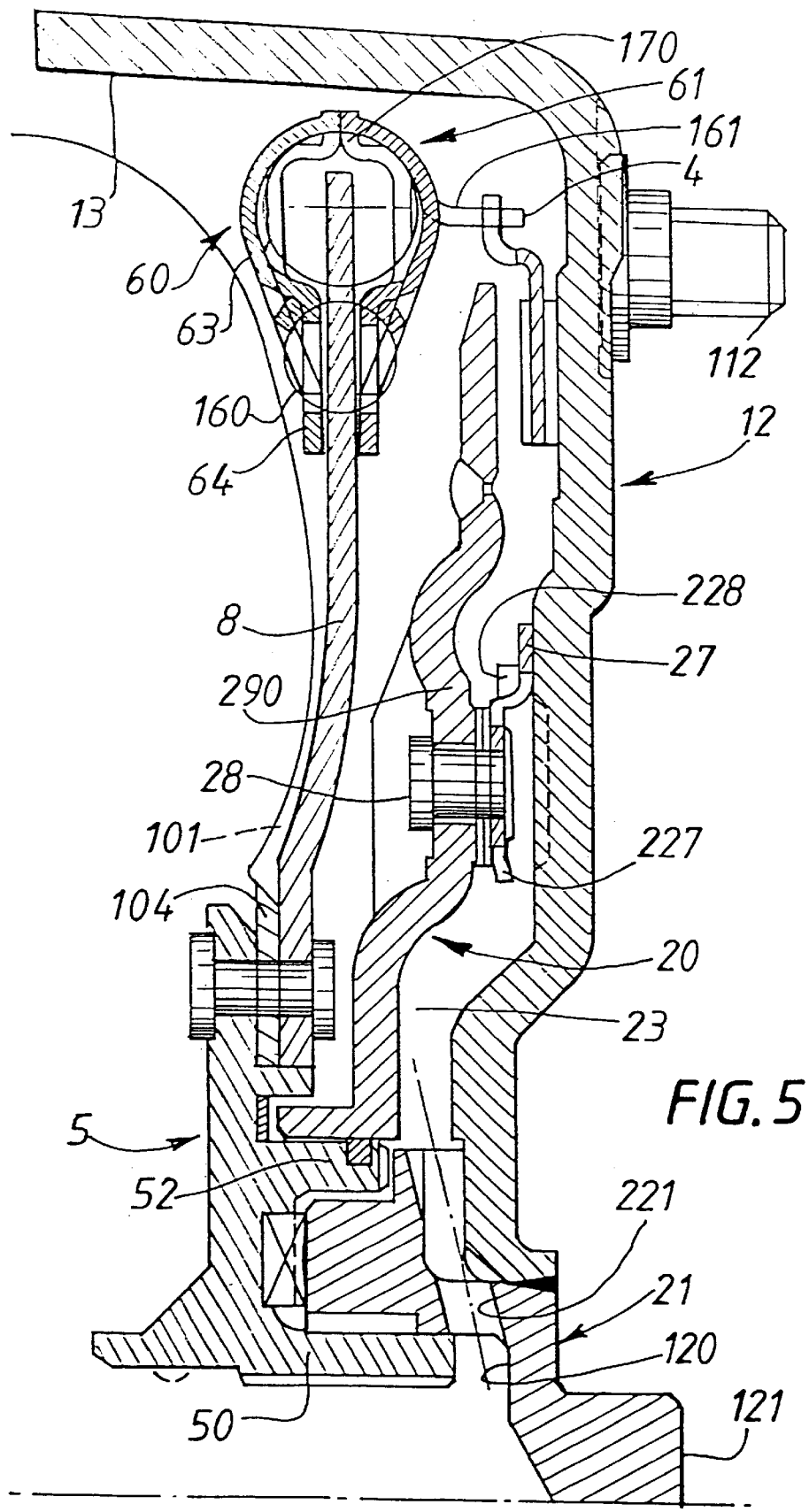
FIGS. 5 and 6 are views similar to FIGS. 1 and 3 for a second example embodiment.
Figure 8:
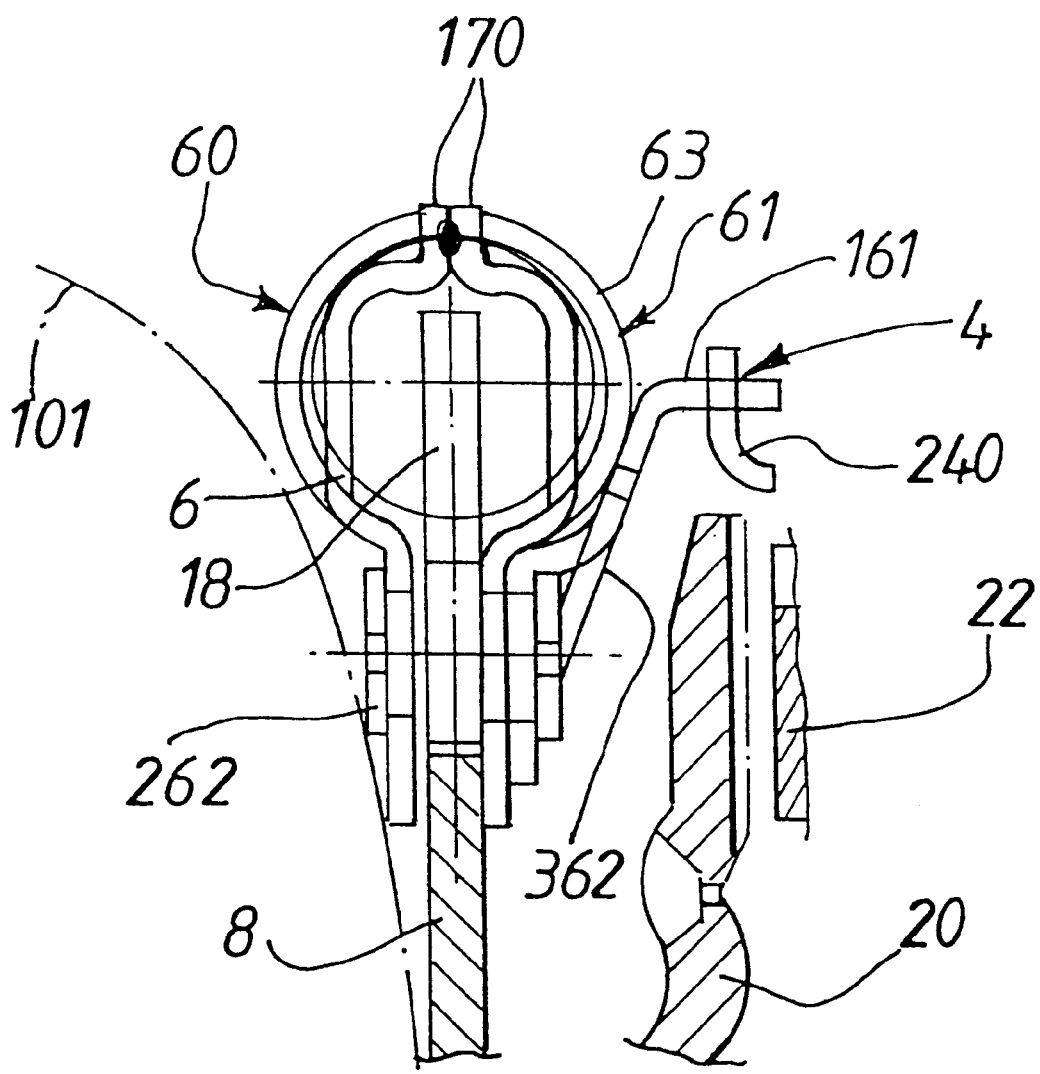
FIG. 8 is a partial view similar to FIG. 1 for a fourth example embodiment.

In FIG. 8 the fixing of the lugs 62 of FIG. 3 has been replaced by the fixing of the small columns 262 of FIG. 5, a single row of springs being provided.

In this case, the guide rings 60, 61 are identical and therefore symmetrical, and the lugs 161 belong to a ring 362 fixed to the guide rings 60, 61 by the small columns 262, the ring 362 being tapered in shape and dished locally for supporting the small columns 262.

It will be noted that, in this FIG. 8, the circular contour 63 has a greater circumferential extent and extends over almost 360° and is connected to transverse parts 164 to which the small columns are fixed.

In all the figures the guide rings 60, 61 are contiguous at their top (at their external periphery) and are fixed locally by welding at this point, between the springs 6 in the dished parts 118. These dished parts 118 are deformed locally at the centre in order to form two contiguous transverse areas 170 extending radially above the lugs 18 of the damper plate 8.

Figure 6:
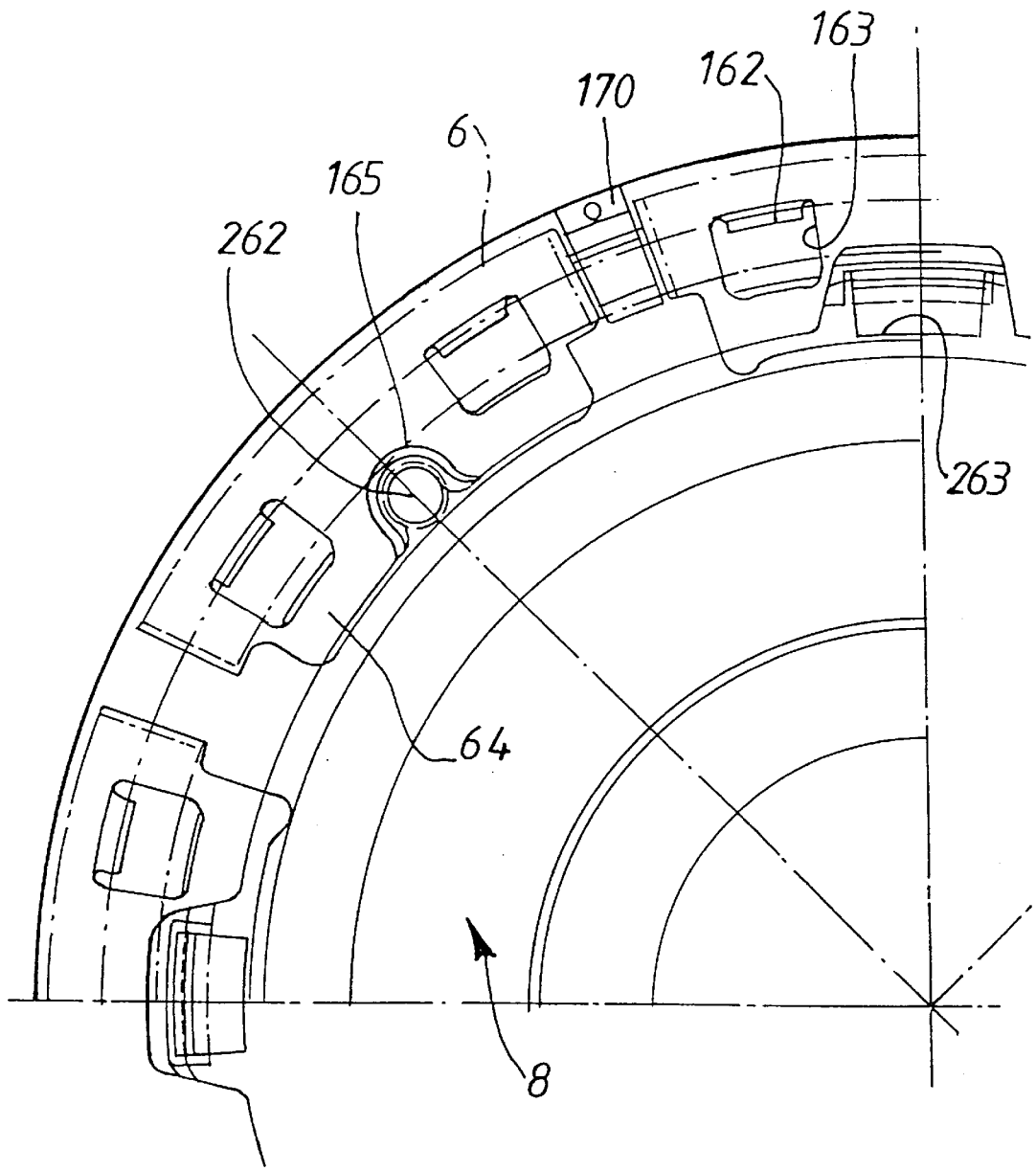

The welding is carried out in these areas 170, visible in one case in FIG. 6.

At their internal periphery the guide washers are connected together by lugs 62 or braces 262.

Naturally, the sleeve 16 can be extended and be closed at its end in order to form a centring device. In this case, the ring 21 can be force-fitted in the sleeve 16, as described in the document FR-96 07 146. In this case the ring 21 can be made from synthetic material, so that the presence of the bearing 54 is not obligatory.

Naturally, the ring 22 can be fixed by crimping, deforming the sleeve 16.

The presence of the torsion damper is not obligatory. The disc 24 can be made integral in rotation with lugs for the mortise and tenon connection 4, the said lugs being secured to an annulus fixed to the turbine wheel. The disc 24 can be embedded in a friction lining 22 intended to be clamped between the piston 20 and wall 11.

The presence of the bearing 54 is not obligatory. This is because a pilot bearing can be mounted in the blind hole 120 in order to centre the end of the driven shaft.

In all cases a pilot bearing is provided, such as the bearing 54, in order to ensure good concentricity between the hub 5 and centring device 21.

By virtue of the holes 229, 29 it is possible to fix the tongues 26 locally, for example by welding or bonding, respectively to the piston 20 and to the wall 11. It will be appreciated that the solution in FIG. 7 is favourable since the hydraulic pressure prevailing in the main chamber presses the shouldered plug 339 against the piston 20.

In addition, the wall 11 is intact.

In general terms, according to the invention, the elastic tongues 26 are fixed on the one hand, at one of their ends, by first means of fixing to one of the transverse wall 11/piston 20 pieces, referred to as the first piece, and on the other hand, at their other end, by second means of fixing to the other one of the transverse wall 11/piston 10 pieces, referred to as the second piece. The first piece (or first element) has passage holes 29, 229 coinciding axially with the second fixing means. These passage holes 29, 229 are closed off finally by sealing obturators 129, 339. The fixing means can consist of welding or bonding, extrusions or fixing members.

The invention profits from the circumferential offset between the ends of the tongues 26. This offset allows the creation of the passage holes.

The plugs 29, 229 are shouldered and shorter axially than the passage holes 29, 229. The heads of the plugs can be embedded in the transverse wall or slightly project beyond the piston (FIG. 7).

The tongues 26 may not extend tangentially but be inclined. In all cases the tongues 26 are circumferentially acting since their ends are circumferentially offset.

The guide rings of the torsion damper can have any shape and may not be identical.

Naturally, the obuturator can have another shape and be housed in the thickness of the wall 11 or of the piston 20.

In this case, the obuturator is in the form of a plate 439 and advantage is taken of the shape of the passage hole, which has, in the aforementioned manner, a smaller-diameter portion connected by a transverse shoulder to a larger-diameter portion. The passage hole is therefore stepped in diameter and the plate is housed in the larger-diameter portion constituting a countersink. For example, in FIG. 9, the passage hole can be seen at 539 and, at 540, the shoulder formed by means of the change in diameter. The plate 439 is housed, in the larger-diameter portion, axially between the shoulder 540 and the rear face 541 of the piston 20 turned towards the turbine wheel 101, opposite to the wall 11. Naturally, it is possible, as a variant, to house the plate axially between the shoulder in the hole and the rear face of the wall turned opposite to the piston 20.

The axial length of the larger-diameter portion is greater than the thickness of the plate.

The plate can be fixed by bonding, welding, crimping or deformation in the larger-diameter portion of the passage hole. The fixing is fluidtight.

Thus, in FIG. 9, the plate 439 is brought into contact with the shoulder 540 in the passage hole 539 and the edge of the hole 539 is locally crushed hot, using a punch, at the level of the rear face piston 20. As a result there is a flow of material from the piston marked 531. The plate 439, in contact with the shoulder 540, forming a seat with sealing, is thus axially immobilised after crimping between the flow of material 541 and the shoulder 540.

In FIG. 10, a soldering wire forming a ring 542 is interposed between the plate 439 and the shoulder 540. By heating, for example of an electrical nature, such as induction heating, the soldering ring 542 is caused to melt in order to obtain a sealed fixing. Naturally, the ring 542 can be replaced with glue. It is possible to effect the soldering at the front face, the plate turned in the opposite direction to the shoulder 540.

In FIG. 11, the plate 439' is curved initially, being in contact at its external periphery with the shoulder 540. Next, using a press tool, such as a punch, the plate 439' is crushed in the direction of the arrow F. At the end of this operation, the plate 439' is flat and is in contact with the contour of the larger-diameter portion of the hole 539. A sealed fixing is obtained. Naturally, in FIG. 4, the plug 129 can be replaced with the plate 439 or 439'.

Figure 4:
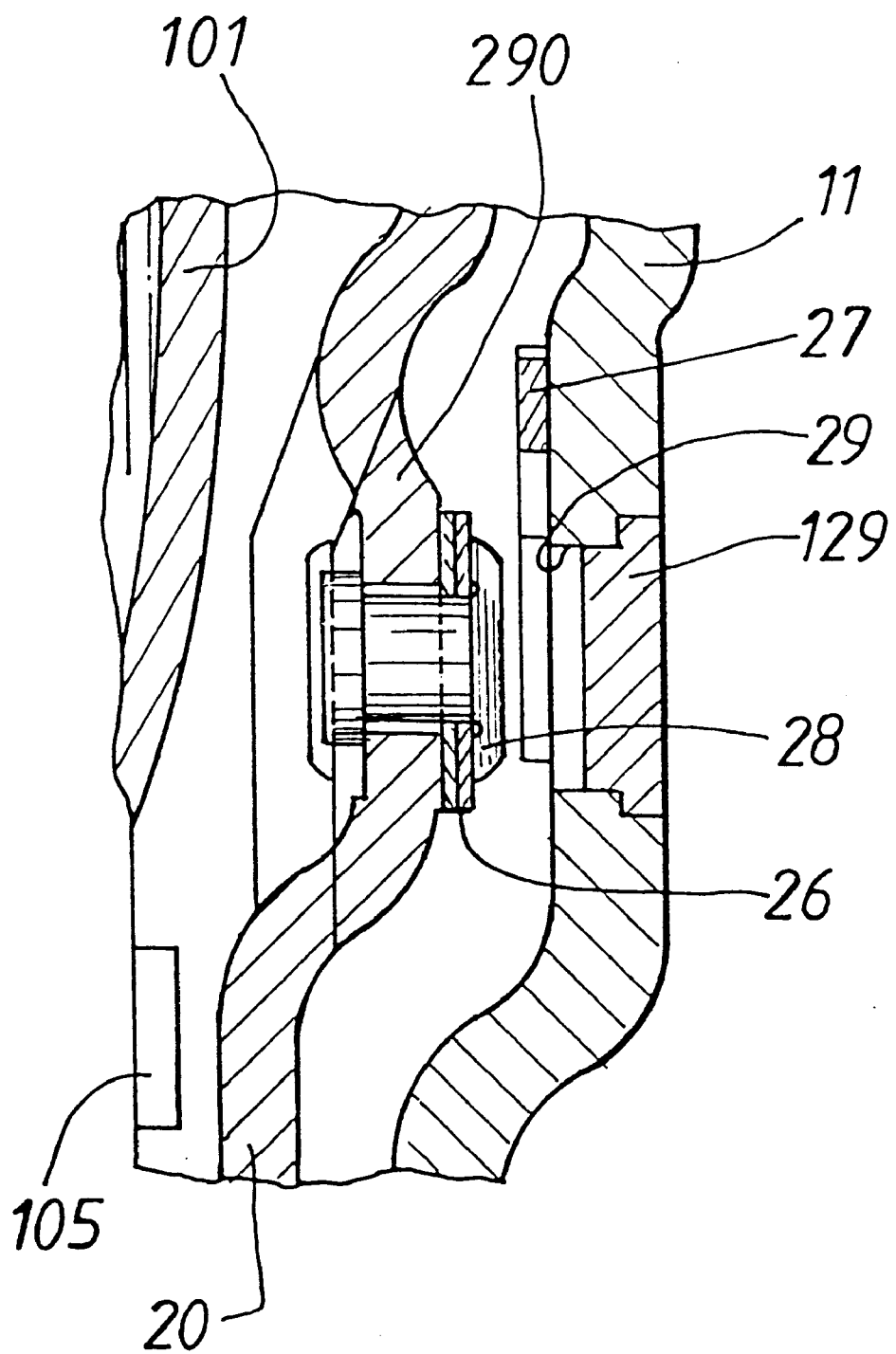
FIG. 4 is a partial view in axial section showing, to a large scale, one of the plugs closing off the transverse wall.

The plate 439 or 439' can be replaced with a plug 639 whose head is housed in the thickness of the larger-diameter portion of the hole 29 in FIG. 4 or of the hole 639 in the piston 20, as can be seen in FIG. 12.

The metallic plug 639 (FIG. 12), 129 (FIG. 4) or 339 (FIG. 7) can be mounted by cooling the plug, for example to −40° in liquid nitrogen, and then introducing the plug into the associated passage hole.

The plug is therefore initially contracted, and then expands, thus jamming sealingly in the passage hole.

Naturally, the head of the plug can extend so as to project with respect to the larger-diameter portion of the passage hole as in FIG. 7.

The passage hole can be not stepped, as visible at 739 in FIG. 13. In this case, the obturator 639 consists of a pellet cold mounted in the hole in the aforementioned manner.

The plug 839 (FIG. 14) can have a head extending in axial projection with respect to the wall 11 or piston 200.

The hole 939 is broadened at the head and has, at the other face, a portion with a larger diameter for housing a collar 831 and therefore delimited by a transverse shoulder 840 formed by means of the change in diameter of the hole.

The collar 841 is housed in the thickness of the wall 11 or piston 20. The broadening of the collar of the hole 939 is tapered in shape for a good seal and the head of the plug curved in shape.

Figure 23:
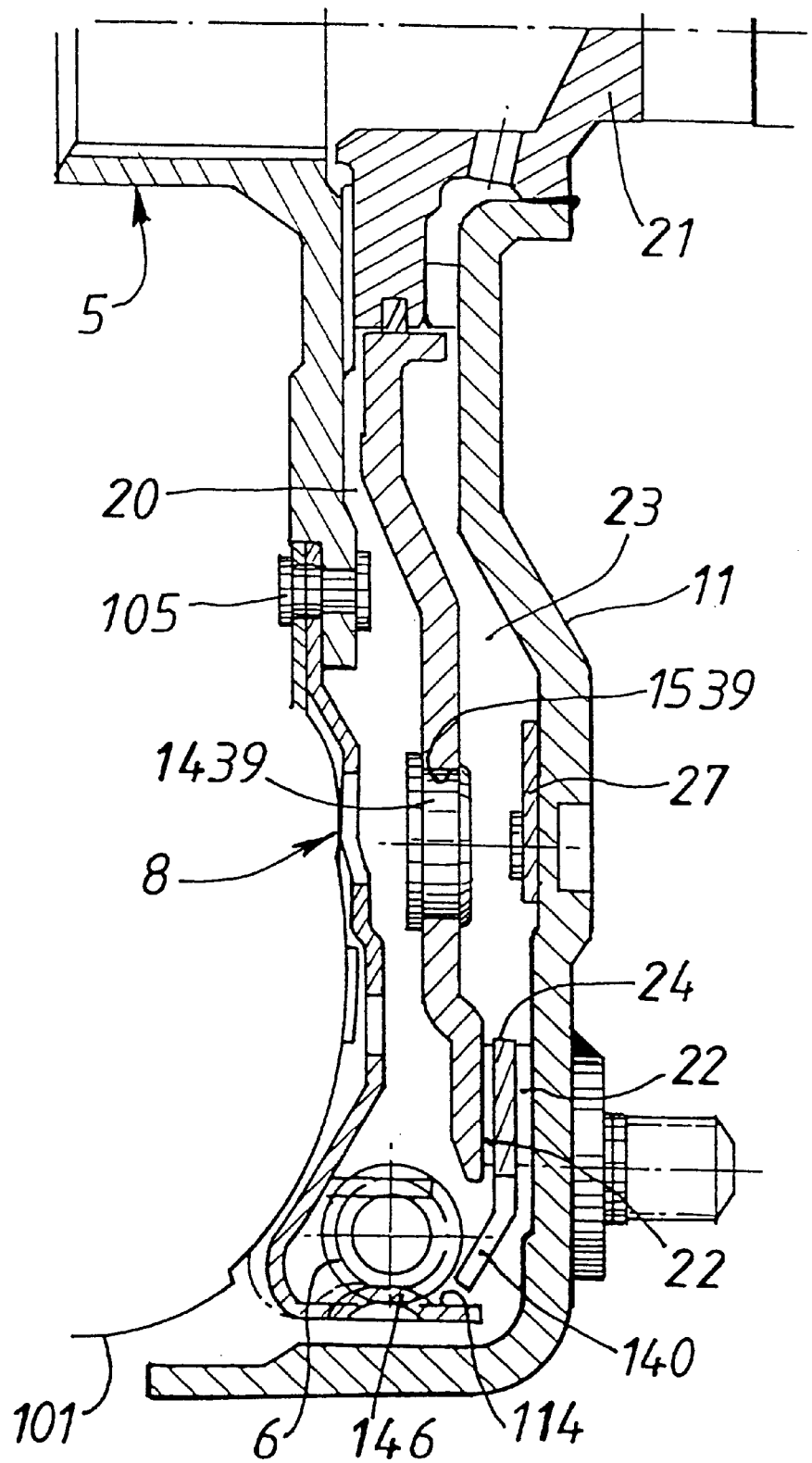
FIG. 23 is a view similar to FIG. 1 for another example embodiment.
Figure 24:
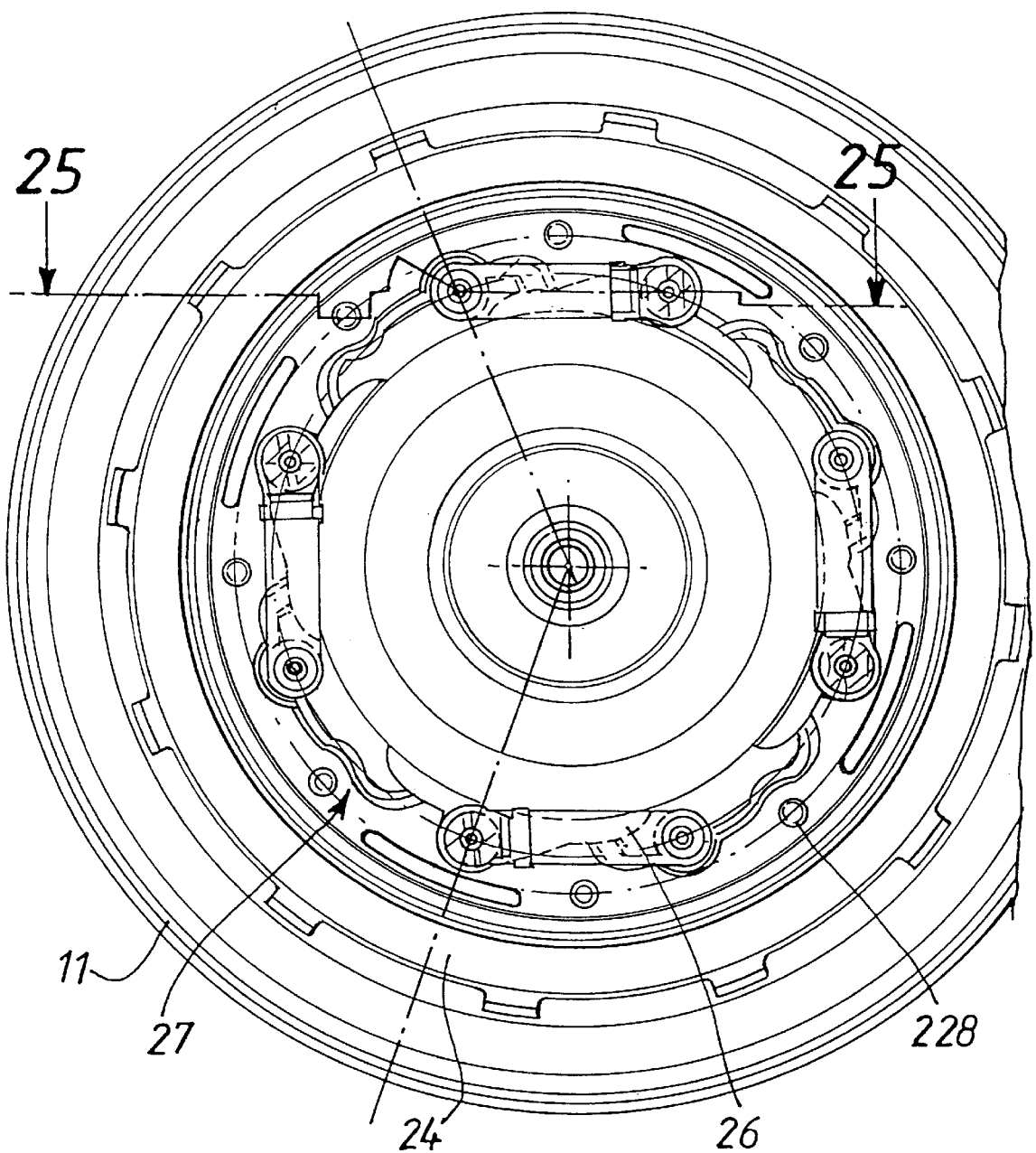
FIG. 24 is a view in the direction of the arrow 24 in FIG. 23 in the piston for showing the drive piece.
Figure 25:
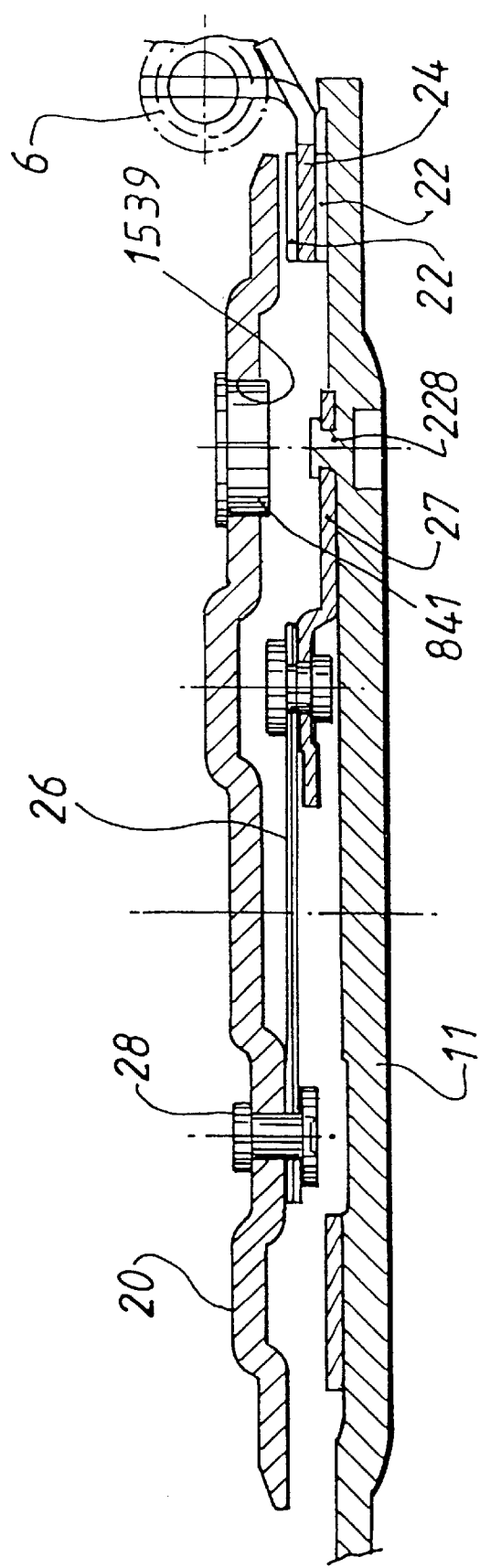
FIG. 25 is a view in section along the line 25—25 in FIG. 24.
Figure 26:
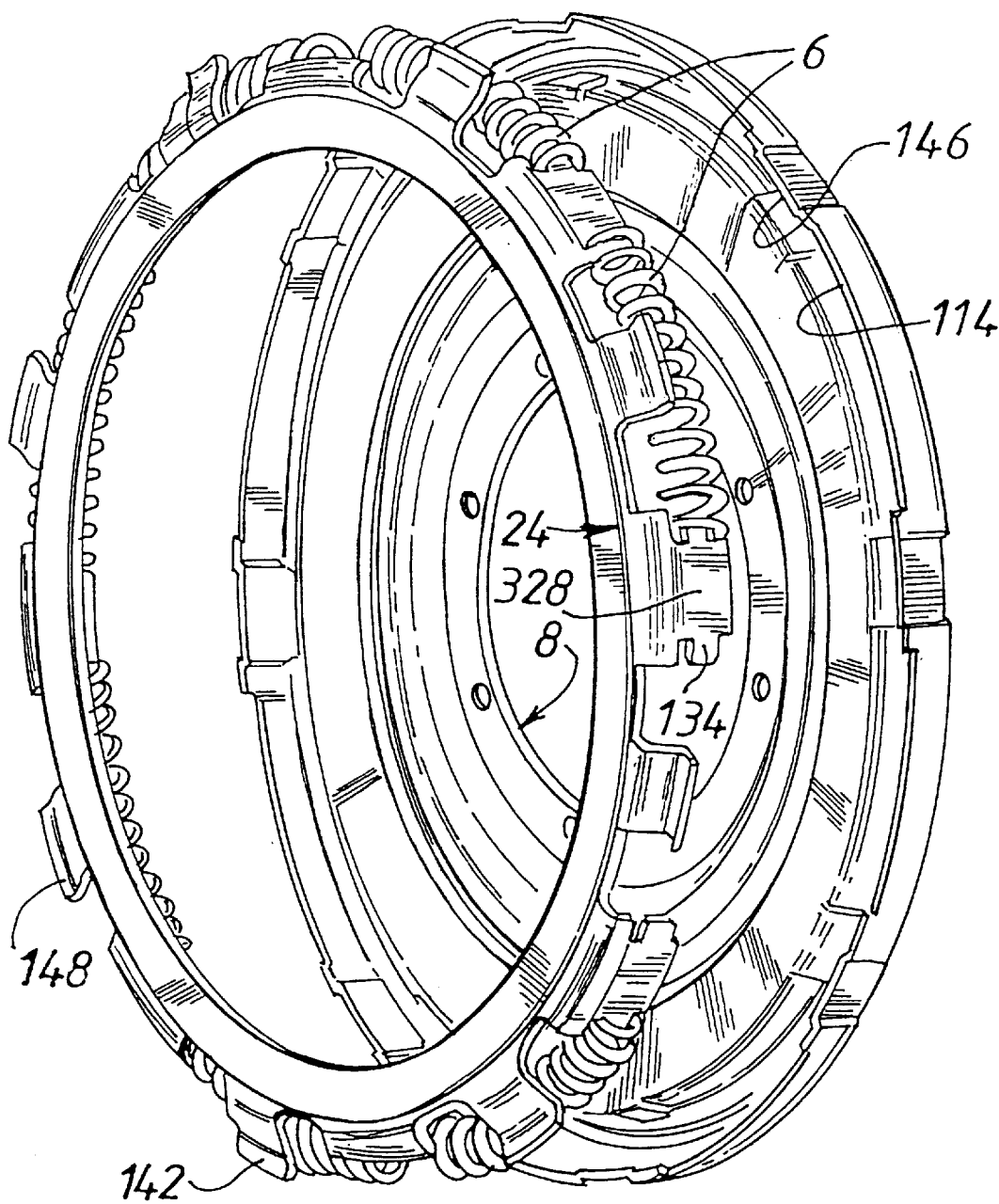
FIG. 26 shows in perspective the damper plate and the disc in FIG. 23.

The collar 841 can be continuous (FIGS. 23, 24). As a variant, it is divided into elastically deformable lugs radially by slots 842, the plug advantageously being made of plastic material for mounting it by snapping into the passage hole.

Figure 15:
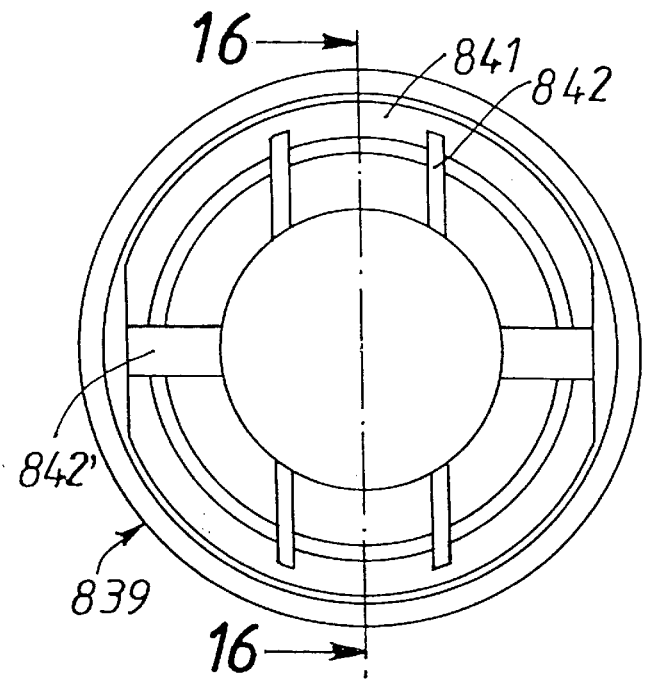
FIG. 15 is a front view of a plug provided with a joint.
Figure 16:
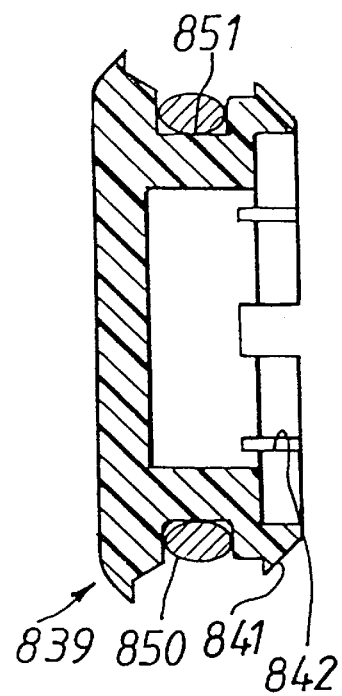
FIG. 16 is a view in axial section of a plug provided with a sealing joint along the line 16 in FIG. 15.

Naturally, a sealing joint can be interposed between the passage hole and the plug in order to complete the seal. For example, in FIG. 9, a rubber joint such as an O-ring seal can be interposed between the shoulder 540 and the plate 439. In FIGS. 15 and 16, it is the plastic plug 839 which is equipped with a sealing joint 850. This joint is mounted in a recess 851 produced in the body of the plug 839 between its head and its collar 841. The joint can have a square, rectangular, circular or other section. In FIG. 16, the joint 850 has an oblong shape.

The plug 839 has six elastically deformable lugs separated in pairs by slots 842 or 842', of different widths, four slots 842 and two slots 842' are provided. Naturally, this number depends on the application. The plug 839, in a variant, has four lugs.

Naturally, the obturator can be in the form of a dish or tray 1039 engaged in a passage hole 1139 with a bevelled end 1040.

The pan 1039 is forcibly engaged in the hole 1139. This pan has an annular rim 1041 bearing on the relevant face of the wall 11 or of the relevant piston 20. A joint can be housed in the cavity delimited by the bevel 1040 and a rim 1041, in order to complete the seal.

As a variant, initially, the pan consists of a ring pressed into the passage hole in order to give it a pan shape.

Figure 18:
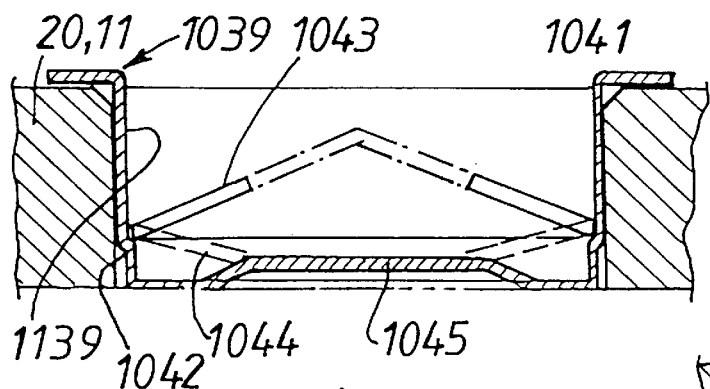
FIG. 18 is a view similar to FIG. 17 for yet another example embodiment.

In FIG. 18, the body of the pan 1039 is internally stepped in diameter with the formation of a shoulder 1042 serving as a support for the external periphery of a tapered Belleville washer 1043. As a variant, several washers 1043 mounted in parallel are provided.

Initially, the Belleville washer 1043 is inclined in the direction of the rim 1041. Using a tool, the Belleville washer 1043 is turned over in contact with the shoulder. After turning over, the Belleville washer occupies its position marked at 1044 and comes into contact with the raised part 1045 of the bottom of the pan.

Figure 20:
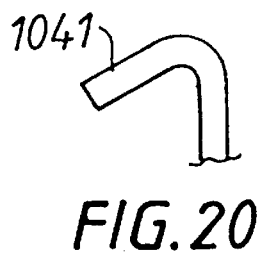
FIG. 20 is a partial view showing the rim of the pan in FIG. 19 before its deformation.
Figure 19:
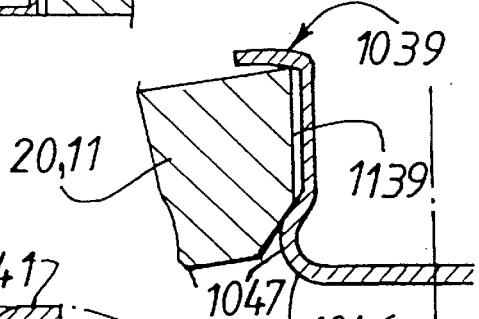
FIG. 19 is a half view similar to FIG. 17 for yet another example embodiment.
Figure 17:
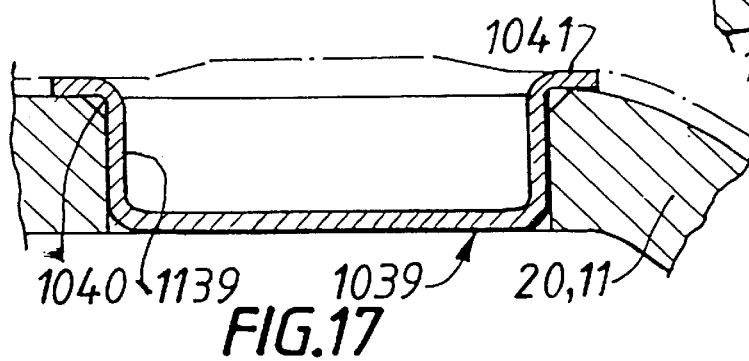
FIG. 17 is a view similar to FIG. 9 in which the obturator consists of a pan or dish.

Under the action of the Belleville washer, the pan 1039 increases in diameter. In FIG. 19, the pan 1039, whose rim 1041 is initially inclined (FIG. 20) is deformed. At the end of the deformation the bottom of the pan 1039 flows. A protrusion 1046 is thus formed in contact with the bevelled end 1047 of the passage hole so that the pan is axially immobilised by its rim 1041 and its protrusion.

Naturally, the direction of mounting of the obturator, for example of the plug 29 of FIG. 4, can be reversed.

Figure 22:
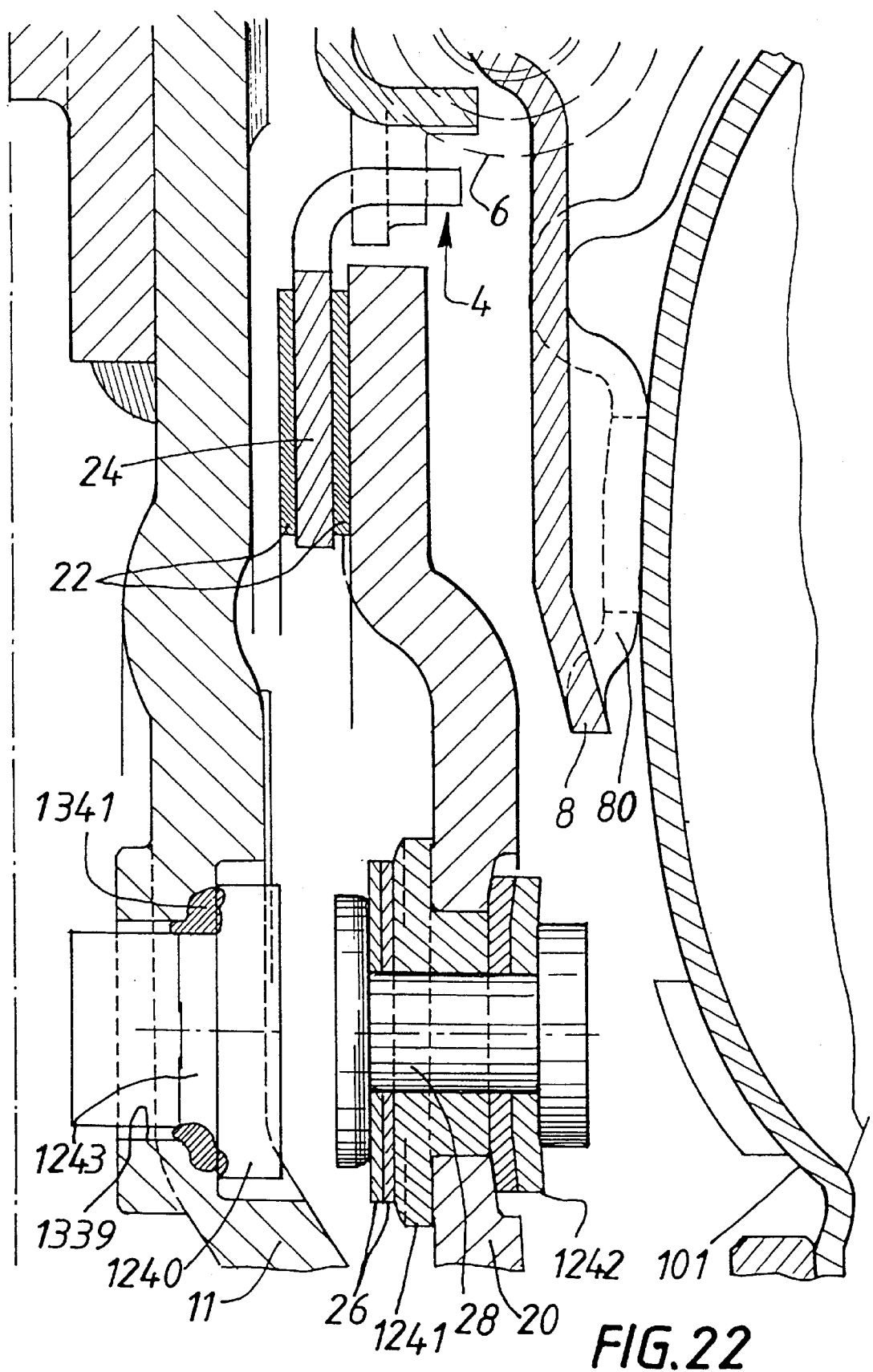
FIG. 22 is a partial view, to a larger scale, of FIG. 21, showing the fixing of the tongues.

To do this, FIGS. 21 and 22, the larger-diameter portion of the passage hole opens out into a control chamber so that the plug 1239 has a head 1240 in contact with the liquid in the control chamber 23.

According to one characteristic, this plug 1239 with reversed head forms a tool for the riveting in the tongues 26. More precisely, the rivets 28 are crushed in contact with the heads 28.

These rivets 28 each pass through a sleeve 1241 with shouldered head so that the tongue are initially inserted between the heads of the rivets and of the sleeve 1241. Each sleeve 1241 passes through the piston 20 and, in accordance with one characteristic, elastic washers 1242 are mounted on the rivets 28 on the side of the piston turned towards the turbine wheel 101, that is to say opposite to the chamber 23.

The free ends of the plugs 1239 being in contact with a fixed part, the free ends of the rivets 28 are crushed by means of a riveting tool. During this operation, the heads of the rivets 28 come into contact with the heads 1240 forming anvils. The free ends of the rivets 28 flow when they are crushed so that the elastic washers 1242 are deformed in contact with the force of the piston 20 turned towards the turbine wheel 101. The plugs 1239 therefore form counter-tools.

Afterwards the plugs 1239 are fixed by welding to the wall 11, knowing that the passage holes 1339 are stepped in diameter, the larger-diameter portion of the hole 1339 opening out into the chamber 23. There is therefore the formation of a shoulder 1340 by means of the change in diameter. The head 1240 of the plug 1239 is connected to the body, forming a rod, of the plug 1239 by a bevelled area 1243 coming into local contact with the edge of the shoulder 1340. By heating of the bodies of the rivets, for example electrically, a sealed welding is effected, marked 1341. During this operation, the rivets are pulled.

Naturally, the welding can be a welding of the friction type. It will be appreciated that the sleeves 1241 make the rivets 28 captive before they are riveted. Thus the tongues 26 are first of all fixed to the wall 11, and then to the piston 20 in the aforementioned fashion. The elastic washers enable the clearances to be taken up.

In this figure, the damper plate 8 of the torsion damper 3 is fixed to the turbine wheel 101. To do this, the metallic damper plate 8 has locally dished parts 80 fixed by clamping to the turbine wheel 101 at the same time as the blades of this wheel, as a variant, the fixing of the dished parts 80, offset axially towards the wheel 101, is effected by welding to the wheel 101.

The inlet part 7 of the damper 3 is produced as in the document WO 94/07 058.

This inlet part consists of a guide ring having a portion for holding the springs 6 in the form of half-shell and support portions for the circumferential ends of the springs.

The damper plate 8 has at its external periphery a holding portion in the form of a half-shell offset axially and radially with respect to that of the guide washer.

This damper plate has clefts with a winding shape for supporting the ends of the springs. The disc 24 meshes with the ring 7, by means of the connection 4 of the mortise and tenon type. For more information, reference should be made to the document WO 94/07 058.

In these FIGS. 21 and 22, the centring device of FIG. 1 to 7 is omitted, the passages 221 being produced in the hub 5 with the interposing of a ring (not referenced) between the wall 11 and the hub 5 in order to reduce friction. The ring is fixed with respect to rotation to the hub 5 by means of studs engaged in blind holes in the hub 5, as can be seen in FIG. 21. The hub has an axially oriented annular guide surface 159 for the piston 20.

Naturally, the disc 24 can have drive lugs 328 received between two consecutive springs.

The damper plate 8 has a peripheral annular portion 114 shaped as an axial recess open axially towards the wall 11. Thus the elastic members 6, carried by the disc 24, or more precisely the lugs 328 provided with flats or fingers 134 for entering the springs. It is the disc 24 which carries the springs 6. The drive plate is fixed to the wall 11 by extruded rivets issuing from the wall 11. Lugs 142, 148 are provided on the damper plate 8 in order to hold the springs.

The damper plate 8 is fixed to the hub 8. The centring device 21 does not serve as a centring device for the hub 5. The damper plate has dished parts 146 for supporting the springs 6. For more information, reference should be made to the document FR 98/02 808 filed on Mar. 3, 1988.

The plug 1439 has a bevelled collar 841, as in FIG. 14. This collar is here continuous. The passage holes 1539 are produced in the piston 20 opposite rivets 228. The holes 1539 are cylindrical, having no steps. The head of each plug projects with respect to the rear face of the piston 20 turned towards the damper plate 8. The collar 841 projects axially with respect to the other face of the piston 20 turned towards the wall.

The plug is, for example, made from aluminium and is introduced into the hole 1539 by contraction as mentioned previously. As a variant, it is force-fitted in the hole 1539, preferably being made from plastic, the collar 841 being continuous.

The invention is therefore of universal use, the damper plate 8 being able to mesh directly with the disc 24 as in the embodiment in FIG. 5 in the aforementioned document FR/98 02 808.

Naturally, the structures can be reversed, the recess housing the sealing joint 850 being produced from the wall 11 or piston 20, by means of the passage hole.

What is claimed is:

1. Hydrokinetic coupling appliance, notably for motor vehicles, having an input element (10), in the form of a casing, able to be fixed with respect to rotation to a driving shaft and provided with an axially fixed transverse wall (11), an output element (5) in the form of a hub, a piston (20) mounted at its internal periphery so as to be axially movable with respect to the transverse wall (11) whilst being connected to it with respect to rotation by circumferentially acting elastic tongues (26), at least one friction lining (22) able to be disengageably clamped between the external periphery of the piston (20) and the transverse wall (11), and means for fixing the friction lining (22) to the hub (5), in which the elastic tongues (26) are fixed on the one hand at one of their circumferential ends by first means (228) of fixing to one of the transverse wall (11)/piston (20) pieces, referred to as the first piece, and on the other hand, at the other one of their circumferential ends, by second means (28) of fixing to the other one of the transverse wall (11)/piston (20) pieces, referred to as the second piece, characterised in that the first piece (11–20) has passage holes (29, 229 . . . ) axially coinciding with the second fixing means (28), and in that the passage holes (29, 229 . . . ) are finally closed off by sealing obturators (129, 339 . . . ).

2. Appliance according to claim 1, characterised in that the obturators (229, 339, 439) are shorter than the passage holes (29, 129).

3. Appliance according to claim 1, characterised in that the passage holes (29, 129) are stepped in diameter in order to form a shoulder connecting the smaller-diameter portion to the larger-diameter portion of the passage hole (29, 129).

4. Appliance according to claim 3, characterised in that the obturators consist of plugs (29, 129) stepped in diameter whilst being shouldered in order to cooperate with the shoulder in the passage hole (29, 129), and in that the plugs (29, 129) have a larger-diameter head mounted in the larger-diameter portion of the passage hole (29, 129, 539 . . . ) and connected to a body mounted in the smaller-diameter passage portion in the passage hole (29, 129, 539 . . . ).

5. Appliance according to claim 4, characterised in that the heads of the plugs (129, 339) are embedded in the larger-diameter portions of the passage holes (29, 229).

6. Appliance according to claim 1, characterised in that the obturators consist of plugs (839) having a head and, on the side opposite to their heads, a bevelled collar (841).

7. Appliance according to claim 6, characterised in that the collar (841) is divided into elastically deformable lugs by slots (841, 842).

8. Appliance according to claim 6, characterised in that the collar (841) comes into engagement with one of the faces of the first piece (11–20).

9. Appliance according to claim 7, characterised in that the piece comes into engagement with a shoulder formed in the passage hole.

10. Appliance according to claim 3, characterised in that the obturator consists of a shield (439, 439') mounted in the larger-diameter portion of the passage hole (539).

11. Appliance according to claim 10, characterised in that the shield (439') is mounted by deformation in the passage hole.

12. Appliance according to claim 10, characterised in that the shield (439) is fixed by crimping in the passage hole.

13. Appliance according to claim 1, characterised in that the obturator consists of a pellet (639) mounted in the passage hole (739).

14. Appliance according to claim 1, characterised in that the obturator consists of a pan (1039) mounted in the passage hole (1139) and in that the pan (1039) has a rim (1041) in contact with one of the faces of the first piece (11–20).

15. Appliance according to claim 14, characterised in that the pan (1039) has a protrusion (1046) on the opposite side to the rim (1041).

16. Appliance according to claim 14, characterised in that at least one immobilisation Belleville washer (1043) is mounted in the pan (1039) in contact on the one hand with a shoulder (1042) formed in the pan (1039) and on the other hand with the bottom (1045) of the latter.

17. Appliance according to claim 1, characterised in that the first piece is the transverse wall (11).

18. Appliance according to claim 1, characterised in that the first piece is the piston (20).

19. Appliance according to claim 1, characterised in that the first (228) and second (28) fixing means are identical to each other.

20. Appliance according to claim 1, characterised in that the second fixing means (28) consist of rivets.

21. Appliance according to claim 1, characterised in that a sealing joint is associated with the obturator in order to complete the seal.

\* \* \* \* \*